United States Patent [19]
Yoshida et al.

[11] Patent Number: 5,770,683
[45] Date of Patent: Jun. 23, 1998

[54] PREPARATION PROCESS OF POLYHYDROXYCARBOXYLIC ACID

[75] Inventors: Yasunori Yoshida, Kanagawa-ken; Michihiko Miyamoto, Fukuoka-ken; Shoji Obuchi, Kanagawa-ken; Kan Ideda, Fukuoka-ken; Masahiro Ohta, Kanagawa-ken, all of Japan

[73] Assignee: Mitsui Toatsu Chemicals, Inc., Tokyo, Japan

[21] Appl. No.: 546,311

[22] Filed: Oct. 20, 1995

[30] Foreign Application Priority Data

| Nov. 2, 1994 | [JP] | Japan | 6-269512 |
| Nov. 7, 1994 | [JP] | Japan | 6-272084 |
| Nov. 17, 1994 | [JP] | Japan | 6-283609 |
| Nov. 28, 1994 | [JP] | Japan | 6-292775 |
| Dec. 7, 1994 | [JP] | Japan | 6-303410 |
| Dec. 7, 1994 | [JP] | Japan | 6-303411 |
| Dec. 21, 1994 | [JP] | Japan | 6-318188 |

[51] Int. Cl.$^6$ .................................................. C08G 63/06
[52] U.S. Cl. .......................... 528/361; 528/354; 528/357; 528/55; 528/80; 528/84; 525/461; 525/466; 525/467; 524/589
[58] Field of Search ..................... 528/361, 354, 528/357, 55, 80, 84; 525/461, 466, 467; 524/589

[56] References Cited

U.S. PATENT DOCUMENTS

| 5,302,694 | 4/1994 | Buchholz . |
| 5,310,865 | 5/1994 | Enomoto et al. . |

FOREIGN PATENT DOCUMENTS

| 443542 | 8/1991 | European Pat. Off. . |
| 491171 | 6/1992 | European Pat. Off. . |
| 572675 | 12/1993 | European Pat. Off. . |
| 615166 | 9/1994 | European Pat. Off. . |
| 56-45920 | 4/1981 | Japan . |
| 61-28521 | 2/1986 | Japan . |
| 62-64823 | 3/1987 | Japan . |
| 62-280220 | 12/1987 | Japan . |
| 1-156319 | 6/1989 | Japan . |
| 5-148352 | 6/1993 | Japan . |
| 6-172502 | 6/1994 | Japan . |
| WO94/03522 | 2/1994 | WIPO . |

*Primary Examiner*—Duc Truong
*Attorney, Agent, or Firm*—Burns, Doane, Swecer & Mathis, L.L.P.

[57] ABSTRACT

A preparation process of polyhydroxycarboxylic acid comprising conducting dehydration polycondensation of hydroxycarboxylic acid or an oligomer of the same in a reaction mixture containing said hydroxycarboxylic acid or the oligomer of the same and an organic solvent substantially in the absence of water to give polyhydroxycarboxylic acid having an weight average molecular weight of 50,000 or more, successively mixing the reaction mixture containing said polyhydroxycarboxylic acid with at least one binder selected from the group consisting of (1) polyisocyanate compound, (2) polybasic acid anhydride, (3) cyclic imino ester, (4) cyclic imino ether, (5) aromatic hydroxycarboxylic acid, (6) polyamino compound, (7) polyhydric alcohol, (8) epoxy compound, (9) polyfunctional aziridine compound, (10) lactam, (11) lactone, and (12) diethylene glycol bischloroforate, and reacting to obtain polyhydroxycarboxylic acid having a weight average molecular weight of 100,000 or more the polyhydroxycarboxylic acid which is obtained by the process has a weight average molecular weight of 100,000 or more, has satisfactory mechanical strength in the form of molded articles and is useful as a degradable polymer for substituting medical materials and general purpose resins.

24 Claims, No Drawings

PREPARATION PROCESS OF POLYHYDROXYCARBOXYLIC ACID

BACKGROUND OF THE INVENTION

1) Field of the Invention

The present invention relates to a preparation process of high molecular weight polyhydroxycarboxylic acid which has sufficient mechanical strength as a molded article and is useful as a degradable polymer for substituting medical materials and general purpose resins.

2) Description of Related Art

Polyhydroxycarboxylic acid is excellent in mechanical, physical and chemical properties and additionally has a degradable function which can be degraded under natural environment conditions without giving a harmful effect on living organisms and is finally decomposed by microorganisms into carbon dioxide and water. Thus, polyhydroxycarboxylic acid plastics have recently focused attention in various fields such as medical materials and alternatives for general purpose resins. Particularly, environmental issues are now clearer and thus such plastics can conform to the needs of the era.

It has been generally known that, for example, in the case of lactic acid or glycolic acid, a high molecular weight polymer can be obtained by subjecting the hydroxycarboxylic acid to dehydration dimerization and successively by carrying out ring-opening melt polymerization of the resulting dimer in the presence of a catalyst (for example, Sn-base catalyst). In the process, however, reaction procedures are complex and the polymer obtained becomes expensive. Additionally, the preparation process is melt polymerization and the polymerization product is pelletized as intact. As a result, the shape of the polymer thus obtained is restricted to pellets. Further, the process cannot be applied to some kinds of hydroxycarboxylic acids which do not form the cyclic dimer.

On the other hand, several processes have been disclosed for preparing polyhydroxycarboxylic acid by direct dehydration polycondensation of hydroxycarboxylic acid and its oligomer (hereinafter referred to as a direct dehydration polycondensation process (Japanese Laid-Open Patent Sho 56-45920, 61-28521 and 62-64823). However, polymers obtained by these processes have the highest weight average molecular weight of about 35,000, are insufficient in mechanical properties and thus cannot be applied to some uses and objects.

U.S. Pat. No. 5,310,865 has disclosed a direct dehydration polycondensation process for preparing polyhydroxycarboxylic acid by azeotropic dehydration of polyhydroxycarboxylic acid or its oligomer in the presence of a catalyst in an organic solvent, while treating the distilled solvent with a drying agent and returning again the treated solvent to the reaction system. Japanese Laid-Open Patent Hei 6-172502 has also disclosed a process for preparing polyhydroxycarboxylic acid by direct dehydration polycondensation using an aromatic ether-base solvent. However, in order to prepare polyhydroxycarboxylic acid having an weight average molecular weight of 100,000 or more by way of these direct dehydration polycondensation processes, a long reaction time of 30 to 50 hours is required depending upon the kind of hydroxycarboxylic acid. Thus, the reaction rate is very slow and disadvantageous in industry.

In order to obtain high molecular polyhydroxycarboxylic acid within a short time, it has been disclosed several processes for extending the molecular chain by reacting with a binder in the stage of increasing the molecular weight to some extent.

For example, Japanese Laid-Open Patent Sho 62-230220 has disclosed a process for activating the molecular chain end by reacting polylactide or polyglycolide with thionyl chloride or acid chloride in a solvent, successively removing the solvent and carrying out melt polycondensation. The process, however, has many steps and additionally requires a long reaction time. Consequently, the process is unfavorable in industry.

Japanese Laid-Open Patent Hei 1-156319 has described a process for increasing the molecular weight by reacting glycol with polylactide or polyglycolide. However, the process requires carrying out the polycondensation reaction at high temperature under reduced pressure. In such a condition, however, the polymer leads to considerable heat decomposition although no description is found. Thus, the process has a disadvantage of generating a cyclic dimer.

U.S. Pat. No. 5,302,694 has taught to react polylactic acid with carbodiimide, phosgene, sulfonyl compound or carbonate ester compound. However, the molecular weight of polylactic acid cannot be increased by merely adding these binders. In order to actually obtain the polymer of a satisfactory molecular weight, addition of amine is required. As a result, the reaction becomes complex and additionally excess labor is needed for removing amine after finishing the reaction. Reaction conditions with polylactic acid are extremely restricted and unsuitable in industry.

In the process of Japanese Laid-Open Patent Hei 5-149352, polyhydroxycarboxylic acid which is obtained by the direct dehydration polycondensation process in the absence of a catalyst and solvent is reacted with isocyanate. However, the direct dehydration process without the catalyst and solvent has a very slow reaction rate and requires a long reaction time. Additionally, the process provides an weight average molecular weight of at most, about 30,000 and is difficult to sufficiently increase the molecular weight even though a binder is used. When the molecular weight is too low, the molecular weight cannot be increased in some cases even though diisocyanate is used.

When isocyanate is used in the stage of a low molecular weight, the resulting polymer contains a substantial proportion of the isocyanate ingredient which remains as an undegradable portion. As a result, a substantial amount of the binder ingredient is released into the natural environment after degradation of the polymer and causes an environmental issue.

As mentioned above, both merits and drawbacks are present in any of the conventional polyhydroxycarboxylic acid preparation processes including those using the binder. In order to steadily exhibit sufficient mechanical properties generally in the uses for films and molded articles, polyhydroxycarboxylic acid has a molecular weight of desirably 100,000 or more, 150,000 or more for specific uses. It has not yet been found a preparation process which can provided a high molecular weight polyhydroxycarboxylic acid having sufficient mechanical properties for a molded product and a low content of binder ingredients, within a short time and suitable in industry.

One object of the invention is to provide a process which can prepare a high molecular weight polyhydroxycarboxylic acid having sufficient mechanical properties, efficiently in industry, with ease, cheaply and steadily without leading to decomposition and other side reactions in the course of manufacture.

Another object of the invention is to provide properties for the polymer by introducing other structures into a polyhydroxycarboxylic acid and controlling the content of the structure.

In practice, the object is to obtain an amorphous polymer by eliminating the crystallinity of the polymer, and to improve mechanical properties and heat resistance of the polymer.

SUMMARY OF THE INVENTION

As a result of an intensive investigation on the preparation process which can prepare high molecular weight polyhydroxycarboxylic acid in industry, within a short time, efficiently, with ease and also cheaply, the present inventors have found that high molecular weight polyhydroxycarboxylic acid can be obtained within a short time by subjecting hydroxycarboxylic acid to direct dehydration polycondensation using an organic solvent in the course of preparing polyhydroxycarboxylic acid and by adding and reacting a binder with the resulting organic solvent solution of polyhydroxy-carboxylic acid having a molecular weight which is increased to a certain extent by the direct dehydration polycondensation using the organic solvent. Thus, the present invention has been completed.

That is, one aspect of the invention is a preparation process of polyhydroxycarboxylic acid comprising conducting dehydration polycondensation of a hydroxycarboxylic acid or an oligomer of the same in a reaction mixture containing said hydroxycarboxylic acid or the oligomer of the same and an organic solvent substantially in the absence of water to give polyhydroxycarboxylic acid having an weight average molecular weight of 50,000 or more, successively mixing the reaction mixture containing said polyhydroxycarboxylic acid with a single compound or a mixture of the binder selected from the group consisting of (1) polyisocyanate compound, (2) polybasic acid anhydride, (3) cyclic imino ester, (4) cyclic imino ether, (5) aromatic hydroxycarboxylic acid, (6) polyamino compound, (7) polyhydric alcohol, (8) epoxy compound, (9) polyfunctional aziridine compound, (10) lactam, (11) lactone and (12) diethylene glycol bischloroformate, and reacting to obtain polyhydroxycarboxylic acid having an weight average molecular weight of 100,000 or more.

The invention is characterized in that the molecular weight of polyhydroxycarboxylic acid can be rapidly increased within a short time by addition of a binder in the reaction for preparing polyhydroxycarboxylic acid.

The invention is further characterized in preparing polyhydroxycarboxylic acid having an weight average molecular weight of 50,000 or more by the direct dehydration polycondensation process in the organic solvent before adding the binder. By the process, the molecular weight can be controlled at a high level when the binder is added. Consequently, polyhydroxycarboxylic acid obtained by reacting with the binder has a high molecular weight and additionally the content of the binder in polyhydroxycarboxylic acid can be controlled to a low level.

DETAILED DESCRIPTION OF THE INVENTION

The present invention will hereinafter be illustrated in detail.

Hydroxycarboxylic acids which can be used as the raw material in the invention include, for example, glycolic acid, lactic acid, 2-hydroxybutanoic acid, 2-hydroxypentanoic acid, 2-hydroxyhexanoic acid, 2-hydroxyheptanoic acid, 2-hydroxyoctanoic acid, 2-hydroxy-2-methylpropanoic acid, 2-hydroxy-2-methylbutanoic acid, 2-hydroxy-2-ethylbutanoic acid, 2-hydroxy-2-methylpentanoic acid, 2-hydroxy-2-ethylpentanoic acid, 2-hydroxy-2-propylpentanoic acid, 2-hydroxy-2-butylpentanoic acid, 2-hydroxy-2-methylhexanoic acid, 2-hydroxy-2-ethylhexanoic acid, 2-hydroxy-2-propylhexanoic acid, 2-hydroxy-2-butylhexanoic acid, 2-hydroxy-2-pentylhexanoic acid, 2-hydroxy-2-methylheptanoic acid, 2-hydroxy-2-ethylheptanoic acid, 2-hydroxy-2-propylheptanoic acid, 2-hydroxy-2-butylheptanoic acid, 2-hydroxy-2-pentylheptanoic acid, 2-hydroxy-2-hexylheptanoic acid, 2-hydroxy-2-methyloctanoic acid, 2-hydroxy-2-ethyloctanoic acid, 2-hydroxy-2-propyloctanoic acid, 2-hydroxy-2-butyloctanoic acid, 2-hydroxy-2-pentyloctanoic acid, 2-hydroxy-2-hexyloctanoic acid, 2-hydroxy-2-heptyloctanoic acid, 3-hydroxypropanoic acid, 3-hydroxybutanoic acid, 3-hydroxypentanoic acid, 3-hydroxyhexanoic acid, 3-hydroxyheptanoic acid, 3-hydroxyoctanoic acid, 3-hydroxy-3-methylbutanoic acid, 3-hydroxy-3-methylpentanoic acid, 3-hydroxy-3-ethylpentanoic acid, 3-hydroxy-3-methylhexanoic acid, 3-hydroxy-3-ethylhexanoic acid, 3-hydroxy-3-propylhexanoic acid, 3-hydroxy-3-methylheptanoic acid, 3-hydroxy-3-ethylheptanoic acid, 3-hydroxy-3-propylheptanoic acid, 3-hydroxy-3-butylheptanoic acid, 3-hydroxy-3-methyloctanoic acid, 3-hydroxy-3-ethyloctanoic acid, 3-hydroxy-3-propyloctanoic acid, 3-hydroxy-3-butyloctanoic acid, 3-hydroxy-3-pentyloctanoic acid, 4-hydroxybutanoic acid, 4-hydroxy-pentanoic acid, 4-hydroxyhexanoic acid, 4-hydroxyheptanoic acid, 4-hydroxyoctanoic acid, 4-hydroxy-4-methyl-pentanoic acid, 4-hydroxy-4-methylhexanoic acid, 4-hydroxy-4-ethylhexanoic acid, 4-hydroxy-4-methylheptanoic acid, 4-hydroxy-4-ethylheptanoic acid, 4-hydroxy-4-propylheptanoic acid, 4-hydroxy-4-methyloctanoic acid, 4-hydroxy-4-ethyloctanoic acid, 4-hydroxy-4-propyloctanoic acid, 4-hydroxy-4-butyloctanoic acid, 5-hydroxypentanoic acid, 5-hydroxyhexanoic acid, 5-hydroxyheptanoic acid, 5-hydroxyoctanoic acid, 5-hydroxy-5-methylhexanoic acid, 5-hydroxy-5-methylheptanoic acid, 5-hydroxy-5-ethylheptanoic acid, 5-hydroxy-5-methyloctanoic acid, 5-hydroxy-5-ethyloctanoic acid, 5-hydroxy-5-propyloctanoic acid, 6-hydroxyhexanoic acid, 6-hydroxyheptanoic acid, 6-hydroxyoctanoic acid, 6-hydroxy-6-methylheptanoic acid, 6-hydroxy-6-methyloctanoic acid, 6-hydroxy-6-ethyloctanoic acid, 7-hydroxyheptanoic acid, 7-hydroxyoctanoic acid, 7-hydroxy-7-methyloctanoic acid, and 8-hydroxyoctanoic acid or a mixture of these acids.

Some of these hydroxycarboxylic acid have an optically active carbon and exhibit morphology of D-, L- and D/L isomers.

However, no particular restriction is imposed upon the morphology of polyhydroxycarboxylic acid in the invention. Further, polyhydroxycarboxylic acid can be a mixture. No particular limitation is put upon the composition of polyhydroxycarboxylic acid.

Polyhydroxycarboxylic acid having an weight average molecular weight of 50,000 or more in the invention can be suitably prepared by the process according to U.S. Pat. No. 5,310,865.

The reaction of polyhydroxycarboxylic acid with the binder in the invention is carried out in an organic solvent or a mixture of the organic solvent selected from the group comprising of a hydrocarbon type solvent, halogenated hydrocarbon type solvent, ether type solvent, ester type solvent, and ketone type solvent.

Specifically, hydrocarbon type organic solvents are aliphatic hydrocarbons and aromatic hydrocarbons. Exemplary aliphatic hydrocarbons include n-hexane, 2,2-dimethylbutane, 2,3-dimethylbutane, 2-methylpentane, 3-methylpentane, n-heptane, 2,2-dimethylpentane, 2,3-dimethylpentane, 2,4-dimethylpentane, 3-ethylpentane, 2-methylhexane, 3-methylhexane, 2,2,3-trimethylbutane, n-octane, 2,2-dimethylhexane, 2,3-dimethylhexane, 2,4-dimethylhexane, 3,3-dimethylhexane, 3,4-dimethylhexane, 3-ethylhexane, 3-ethyl-2-methylpentane, 3-ethyl-3-methylpentane, 2-methylheptane, 3-methylheptane, 4-methylheptane, 2,2,3,3-tetramethylbutane, 2,2,3-trimethylpentane, 2,2,4-trimethylpentane, 2,3,3-trimethylpentane, 2,3,4-trimethylpentane, n-nonane, 2,3-dimethylheptane, 2,4-dimethylheptane, 2,5-dimethylheptane, 3,3-dimethylheptane, 3,4-dimethylheptane, 3,5-dimethylheptane, 4-ethylheptane, 2-methyloctane, 3-methyloctane, 4-methyloctane, 2,2,4-trimethylhexane, 2,2,5-trimethylhexane, 2,3,5-trimethylhexane, n-decane, 3,4-diethylhexane, 2,6-dimethyloctane, 3,3-dimethyloctane, 3,5-dimethyloctane, 4,4-dimethyloctane, 3-ethyl-3-methylheptane, 2-methylnonane, 3-methylnonane, 4-methylnonane, 5-methylnonane, n-undecane, n-dodecane, 2-methylundecane, 3-methylundecane, 2,2,4,6,6-pentamethylheptane, n-tridecane, 4-methyldodecane, n-tetradecane, n-pentadecane, n-hexadecane, 2,2,4,4,6,8,8-heptamethylnonane, n-heptadecane, n-octadecane, n-nonadecane, 2,6,10,14-tetramethylpentadecane, n-eicosane, n-heneicosane, n-docosane, n-tricosane, n-tetracosane, cyclohexane, dimethylbutene, ethylbutene, hexene, methylcyclopentane, methylpentene, cycloheptane, dimethylcyclopentane, dimethylpentene, ethylcyclopentane, ethylpentene, heptene, methylcyclohexane, methylhexene, trimethylbutene, cyclooctane, dimethylcyclohexane, dimethylhexene, ethylcyclohexane, ethylhexene, methylheptene, octene, propylcyclopentene, trimethylpentene, diethylcyclopentane, dimethylheptene, ethylmethylcyclohexane, isopropylcyclohexane, n-propylcyclohexane, methyloctene, nonene, trimethylcyclohexane, trimethylhexene, butylcyclohexane, t-butylcyclohexane, decene, isobutylcyclohexane, isopropylmethylcyclohexane, methylnonene, pentylcyclopentane, amylcyclohexane, undecene, cyclododecane, dodecane, hexylcyclohexane, 2,2,4,6,6-pentamethylheptene, triisobutylene, heptylcyclohexane, tridecene, tetradecene, octylcyclohexane, cyclopentadecane, pentadecene, nonylcyclohexane, decylcyclohexane, hexadecene, tetraisobutylene, heptadecene, undecylcyclohexane, octadecene, dodecylcyclohexane, nonadecene, tridecylcyclohexane, eicosene, docosene, tricosene, cyclohexene, dimethylbutadiene, hexadiene, methylcyclopentene, methylpentadiene, cycloheptene, ethylcyclopentene, heptadiene, methylcyclohexene, methylenecyclohexane, methylhexadiene, norbornane, cyclooctene, dimethylcyclohexadiene, methylheptadiene, octadiene, allylcyclohexane, hydrindane, methyloctadiene, nonadiene, decadiene, decalin, undecadiene, bicyclohexyl cyclododecene, dodecadiene and tetradecadiene.

Exemplary aromatic hydrocarbons include o-xylene, m-xylene, p-xylene, naphthalene, 1-methylnaphthalene, 2-methylnaphthalene, 1-ethylnaphthalene, 2-ethylnaphthalene, 1,2-dimethylnaphthalene, 1,3-dimethylnaphthalene, 1,4-dimethylnaphthalene, 1,5-dimethylnaphthalene, 1,6-dimethylnaphthalene, 1,7-dimethylnaphthalene, 1,8-dimethylnaphthalene, 2,3-dimethylnaphthalene, 2,6-dimethylnaphthalene, 2,7-dimethylnaphthalene, 1,2-diethylnaphthalene, 1,3-diethylnaphthalene, 1,4-diethylnaphthalene, 1,5-diethylnaphthalene, 1,6-diethylnaphthalene, 1,7-diethylnaphthalene, 1,8-diethylnaphthalene, 2,3-diethylnaphthalene, 2,6-diethylnaphthalene, 2,7-diethylnaphthalene, 1-methyl-2-ethylnaphthalene, 1-methyl-3-ethylnaphthalene, 1-methyl-4-ethylnaphthalene, 1-methyl-5-ethylnaphthalene, 1-methyl-6-ethylnaphthalene, 1-methyl-7-ethylnaphthalene, 1-methyl-8-ethylnaphthalene, 2-methyl-1-ethylnaphthalene, 2-methyl-3-ethylnaphthalene, 2-methyl-4-ethylnaphthalene, 2-methyl-5-ethylnaphthalene, 2-methyl-6-ethylnaphthalene, 2-methyl-7-ethylnaphthalene, 2-methyl-8-ethylnaphthalene, 1-methoxynaphthalene, 2-methoxynaphthalene, 1-ethoxynaphthalene, 2-ethoxynaphthalene, 1-acetonaphthone, 2-acetonaphthone, 1,4-dihydronaphthalene, 1,2,3,4-tetrahydronaphthalene, biphenyl, 2-methylbiphenyl, 3-methylbiphenyl, 4-methylbiphenyl, 2-ethylbiphenyl, 3-ethylbiphenyl, 4-ethylbiphenyl, 2,2'-dimethylbiphenyl, 3,3'-dimethylbiphenyl, 4,4'-dimethylbiphenyl, 2,2'-diethylbiphenyl, 3,3'-diethylbiphenyl, 4,4'-diethylbiphenyl, 2-methoxybiphenyl, 3-methoxybiphenyl, 4-methoxybiphenyl, 2-ethoxybiphenyl, 3-ethoxybiphenyl, 2,2'-dimethoxybiphenyl, 3,3'-dimethoxybiphenyl, 4,4'-dimethoxybiphenyl.

Halogenated hydrocarbon type organic solvents are halogenated aliphatic hydrocarbons and halogenated aromatic hydrocarbons. Exemplary halogenated aliphatic hydrocarbons include trichloromethane, tetrachloromethane, 1,1-dichloroethane, 1,2-dichloroethane, 1,1,1-trichloroethane, 1,1,2-trichloroethane, 1,1,1-trichloroethylene, 1,1,1,2-tetrachloroethane, 1,1,2,2-tetrachloroethane, 1-chloropropane, 1-chlorobutane, 1-chloropentane, 1-chlorohexane, 1-chlorooctane, 1-chlorodecane, 1-chlorotetradexane, 1,3-dichloropropane, 1,4-dichlorobutane, 1,5-dichloropentane, 1,6-dichlorohexane, 1,8-dichlorooctane, 1,10-dichlorodecane, 1,2-dibromoethane, 1,1,1-tribromoethane, 1,1,2-tribromoethane, 1,1,2-tribromoethylene, 1,1,1,2-tetrabromoethane, 1,1,2,2-tetrabromoethane, 1-bromopropane, 1-bromobutane, 1-bromopentane, 1-bromohexane, 1-bromooctane, 1-bromodecane, 1,3-dibromopropane, 1,4-dibromobutane, 1,5-dibromopentane, 1,6-dibromohexane, 3-bromo-1-propene, 1-bromo-2-chloropropane, 1-bromo-2-chloroethane, 1-bromo-5-chloropentane and hexachloroethane.

Exemplary halogenated aromatic hydrocarbons include chlorobenzene, o-chlorotoluene, m-chlorotoluene, p-chlorotoluene, 2-chloroethylbenzene, o-chloroethylbenzene, o-dichlorobenzene, m-dichlorobenzene, p-dichlorobenzene, 2,3-dichlorotoluene, 2,4-dichlorotoluene, 2,5-dichlorotoluene, 2,6-dichlorotoluene, 3,4-dichlorotoluene, 1,2,3-trichlorobenzene, 1,2,4-trichlorobenzene, 1,3,5-trichlorobenzene, α, α, α-trichlorobenzyl, α,2,4-trichlorobenzyl, α,2,6-trichlorobenzyl, α,3,4-trichlorobenzyl, pentachlorobenzene, hexachlorobenzene, bromobenzene, o-bromotoluene, m-bromotoluene, p-bromotoluene, o-dibrombenzene, m-dibromobenzene, p-dibromobenzene, 2,3-dibromotoluene, 2,4-dibromotoluene, 2,5-dibromotoluene, 2,6-dibromotoluene, 3,4-dibromotoluene, 1-bromoethylbenzene, 2-bromoethylbenzene, o-bromoethylbenzene, 1,2,3-tribromobenzene, 1,2,4-tribromobenzene, 1,3,5-tribromobenzene, iodobenzene, iodobenzyl, o-iodotoluene, m-iodotoluene, p-iodotoluene, 1-fluoronaphthalene, 2-fluoronaphthalene, 1-iodonaphthalene, 2-iodonaphthalene, 2-chlorobiphenyl, 3-chlorobiphenyl, 4-chlorobiphenyl, 2-bromobiphenyl, 3-bromobiphenyl, 4-bromobiphenyl, 2-fluorobiphenyl, 3-fluorobiphenyl, 4-fluorobiphenyl, 2-iodobiphenyl, 3-iodobiphenyl, and 4-iodobiphenyl. These solvents be used singly or as a mixture. Particularly, halogenated aromatic hydrocarbon solvents are preferred because the polymerization rate is fast and a higher molecular weight can be obtained.

Ether type organic solvents are aliphatic ether solvents, aromatic ether solvents and halogenated compounds of these solvents. Exemplary aliphatic ether solvents include, n-propyl ether, isopropyl ether, allyl ether, butyl ethyl ether, butyl vinyl ether, n-butyl ether, isobutyl ether, amyl ether, isoamyl ether, n-hexyl ether, n-heptyl ether, n-octyl ether, di(2-ethylhexyl) ether, monoglyme, diglyme, tetrahydrofuran, tetrahydropyran and dioxane.

Exemplary aromatic ether solvents include, anisole ethoxybenzene, propoxybenzene, butoxybenzene, pentoxybenzene, 2,4-dimethoxybenzene, 2-chloromethyoxybenzene, 2-bromomethoxybenzene, 4-chloromethoxybenzene, 4-bromomethoxybenzene, 2,4-dichloromethoxybenzene; diphenyl ether, 4,4'-dimethyldiphenyl ether, 3,3'-dimethyldiphenyl ether, 3-methyldiphenyl ether and other alkyl substituted diphenyl ethers; 4,4'-dibromodiphenyl ether, 4,4'-dichlorodiphenyl ether, 4-bromodiphenyl ether, 4-methyl-4-bromodiphenyl ether and other halogen substituted diphenyl ethers; 4-methoxydiphenyl ether, 4,4'-dimethyoxydiphenyl ether, 3,3'-dimethoxydiphenyl ether, 4-methyl-4'-methoxydiphenyl ether and other alkoxy substituted diphenyl ethers; and dibenzofuran, xanthane and other cyclic diphenyl ethers.

Ester type organic solvents are aliphatic ester solvents and aromatic ester solvents. Exemplary aliphatic ester solvents include ethyl acetate, propyl acetate, butyl acetate, amyl acetate, pentyl acetate, hexyl acetate, cyclohexyl acetate, 2-ethylbutyl acetate, 2-ethylhexyl acetate, methoxybutyl acetate, methyl acetoacetate, ethyl acetoacetate, ethylene glycol diacetate, diethylene glycol monoethyl ether acetate, diethylene glycol monobutyl ether acetate, methyl monochloroacetate, methyl propionate, ethyl propionate, butyl propionate, ethyl butyrate, butyl butyrate, isobutyl isobutyrate, isoamyl butyrate, methyl caproate, ethyl caproate, methyl caprylate, ethyl caprylate, methyl caprate, ethyl caprate, ethyl isovalerate, methyl maleate, ethyl maleate, butyl maleate, butyl sebacate, butyl stearate, amyl stearate, methyl oleate, ethyl oleate, ethyl oxalate, butyl oxalate, ethyl carbonate, butyrolactone, ethyl acrylate and ethyl methacrylate.

Exemplary aromatic ester solvents include methyl benzoate, ethyl benzoate, propyl benzoate, isoamyl benzoate, butyl benzoate, benzyl benzoate, dimethyl phthalate, diethyl phthalate, benzyl acetate, and ethyl cinnamate. Aromatic ester solvents are particularly preferred because polymerization rate is fast and higher molecular weight can be obtained.

Ketone type organic solvents are aliphatic ketone solvents and aromatic ketone solvents. Exemplary aliphatic ketone solvents include acetylacetone, methyl ethyl ketone, 3-pentanone, 4-methyl-2-pentanone, cyclopentanone, 2-cyclopentene-1-one, cyclohexanone, 1,2-cyclohexanedione, 1,3-cyclohexanedione, 1,4-cyclohexanedione, cycloheptanone, cyclooctanone, 4-methylcyclohexanone, 4-ethylcyclohexanone, 2-tert-butylcyclohexanone, 4-tert-butylcyclohexanone, cyclohexenylcyclohexanone, cycloundecanone, cyclotridecanone, benzylacetone, 1-phenyl-2-butanone, 2-methoxyphenylacetone, 3-methoxyphenylacetone, 4-methoxyphenylacetone and cyclohexyl ketone.

Exemplary aromatic ketone solvents include acetophenone, 2'-methylacetophenone, 3'-methylacetophenone, 4'-methylacetophenone, 4'-ethylacetophenone, 4'-ethoxyacetophenone, 2',4'-dimethylacetophenone, 3',4'-dimethylacetophenone, acetylacetophenone, propiophenone, 4'-methylpropiophenone, 4'-methoxypropiophenone, butyrophenone, isobutyrophenone, 4,-butylacetophenone, cyclopentyl phenyl ketone, benzophenone, anthraquinone and 4-naphthoquinone.

These solvents are used in the range so as to obtain a polymer concentration of generally 3 to 90% by weight, preferably 15 to 80% by weight, more preferably 30 to 70% by weight. When the polymer concentration exceeds 90% by weight, the viscosity of the polymer solution becomes extremely high and handling such as transfer of the reaction mixture or operation such as stirring becomes difficult. On the other hand, a polymer concentration lower than 3% by weight causes no problem on the reaction and post treatment. However, volume efficiency is poor and disadvantageous in view of productivity.

Preparation of polyhydroxycarboxylic acid having a weight average molecular weight of 50,000 or more in the invention must be carried out under a water content of 50 ppm or less, preferably 20 ppm or less, more preferably 5 ppm in the reaction mixture. Accordingly, water generated by the dehydration polycondensation is distilled together with the organic solvent out of the reaction system, and an organic solvent having a moisture content of 50 ppm or less is simultaneously fed to the reaction system as an additional solvent while continuing the reaction. When the distilled organic solvent is used as the additional solvent, the distilled organic solvent passes through a dehydration device and a dried organic solvent can return again to the reaction system.

In the dehydration device, the distilled solvent can be dried by use of a column packed with a dehydrating agent.

Exemplary dehydrating agents include molecular sieves (3A, 4A, 5A etc.), silica gel and other inorganic drying agents; diphosphorus hydroxide, phosphorus pentoxide and other phosphorus compounds; calcium hydride, sodium hydride, lithium hydride, and other metal hydrides; sodium, lithium, potassium, calcium and other alkali metals and alkali earth metals; and ion exchange resins. In other methods which can be used, the water contained in the refluxing solvent is separated and removed by using a device having the ability of distillation and separation. Alternatively, refluxing distillate can once flow out of the reaction system and is successively distilled and separated, and the dehydrated solvent can return to the reaction system. No restriction is imposed upon the method so long as the solvent returning to the reaction system is substantially free from the water.

Catalysts are preferably used in order to cut the reaction time in the process of the invention.

The catalysts which can be used are metals of the group I, II, III, IV and V in the periodic table and salts of these metals. Exemplary catalysts include, for example, zinc, tin, aluminum, magnesium, and other metals; tin oxide, antimony oxide, zinc oxide, aluminum oxide, magnesium oxide, titanium oxide and other metal oxides; zinc chloride, stannous chloride, stannic bromide, antimony fluoride, magnesium chloride, aluminum chloride and other metal halogenides; tin sulfate, zinc sulfate, aluminum sulfate and other metal sulfates; tin hydroxide, zinc hydroxide and other metal hydroxides; magnesium carbonate, zinc carbonate, calcium carbonate and other metal carbonates; tin acetate, tin octoate, tin lactate, zinc acetate, aluminum acetate and other metal organic carboxylates; and tin trifluoromethanesulfonate, tin p-toluenesulfonate and other metal organic sulfonates.

Other catalysts also include dibutyltin oxide and other organometal oxides of the above metals; titanium isopropoxide and other alkoxides of the above metals; diethyl zinc and other metal alkyls of the above metals; and Dowex, Amberlite and other ion exchange resins. The amount of the catalyst is preferably 0.0001 to 10% by weight for the above hydroxycarboxylic acid or the oligomer thereof.

The direct dehydration polymerization can also be carried out in the presence of a coloration inhibitor in order to protect from coloration due to heat deterioration in the course of polymerization. Coloration inhibitors which can be preferably used include phosphoric acid, triphenyl phosphate, pyrophosphoric acid, phosphorous acid, triphenyl phosphate and other phosphorus compounds. The amount of these compounds is preferably 0.01 to 5% by weight, more preferably 0.5 to 2% by weight for the polymer. An amount less than 0.01% by weight decreases the effect on inhibition of coloration. On the other hand, when the amount exceeds 5% by weight, further effect on coloration inhibition cannot be expected and additionally an increase in polymerization degree becomes difficult in some cases.

The direct dehydration polymerization can be carried out usually at the boiling point of the solvent under atmospheric or reduced pressure. The range of polymerization temperatures can be up to the reflux temperature of the solvent used and is preferably 50° to 220° C., more preferably 100° to 170° C. When the temperature is lower than 50° C., the efficiency for removing generated water from the reaction system is reduced and thus reaction velocity decreases extremely. On the other hand, a temperature exceeding 220° C. leads to deterioration of the polymer and thus results in coloration of the reaction mixture and impairs quality of the product obtained.

These processes can prepare polyhydroxycarboxylic acid having an weight average molecular weight of 50,000 to 100,000 with ease in a short time. However, a very long reaction time is required in order to obtain high molecular weight polyhydroxycarboxylic acid having a weight average molecular weight of 100,000 or more when the dehydration polycondensation reaction is continued as such. Consequently, below described binders are added at the time when the weight average molecular weight of polyhydroxycarboxylic acid exceeds 50,000. By the addition, polycondensation time is dramatically cut and new properties can be expected for the high molecular weight polyhydroxycarboxylic acid thus obtained depending upon the kind and amount of the binder.

At the addition of the binder, polyhydroxycarboxylic acid has a weight average molecular weight in the range of 50,000 to 150,000, preferably 60,000 to 140,000, more preferably 70,000 to 120,000, most preferably 80,000 to 100,000.

When the binder is added to polyhydroxycarboxylic acid having a weight average molecular weight of less than 50,000, the molecular weight increase is slight the molecular weight is extremely low, for example, a weight average molecular weight of 20,000 or less. However, in the case of increasing the molecular weight by addition of the binder to polyhydroxycarboxylic acid having a low molecular weight, greater numbers of molecular chain ends unfavorably require proportionally a large amount of the binder. When such amount of the binder is built in a skeleton of degradable polyhydroxycarboxylic acid, a substantial amount of undecomposed portion remains after degradation of polyhydroxycarboxylic acid and leads to a disadvantage of releasing a substantial amount of the binder ingredient to the natural environment. It is a surprising fact that, when polyhydroxycarboxylic acid has an weight average molecular weight of 20,000 or less, the weight average molecular weight cannot be increased to 100,000 or more even though the amount of the binder is increased.

The reason for this fact is assumed to be that many molecular chain ends which remain in the stage of a low molecular weight are liable to cause a dehydration polycondensation reaction and thus generated water probably reacts with a functional group of the binder or a side reaction occurs to form a functional group which does not contribute to the molecular chain extension of the polymer. Consequently, the weight average molecular weight of the polymer before reacting with the binder must be 50,000 or more.

On the other hand, a weight average molecular weight exceeding 150,000 reduces the effect of the binder addition because of a decrease in the reactive chain ends. Further, preparation of polyhydroxycarboxylic acid having a molecular weight exceeding 150,000 by direct dehydration polycondensation process requires extensive time and labor.

Polyisocyanate compounds which can be used as a binder in the invention include, for example, hexamethylene diisocyanate, 2,4-tolylene diisocyanate, a mixture of 2,4- and 2,6-tolylene diisocyanate, 4,4'-diphenylmethane diisocyanate, xylene diisocyanate, isophorone diisocyanate, trimethylene diisocyanate, tetramethylene diisocyanate, pentamethylene diisocyanate, 1,2-propylene diisocyanate, 2,3-butylene diisocyanate, 1,3-butylene diisocyanate, 2,4,4-trimethylhexamethylene diisocyanate, dodecamethylene diisocyanate, 2,6-diisocyanatomethyl caproate, 1,3-cyclopentane diisocyanate, 1,4-cyclohexane diisocyanate, 1,3-cyclohexane diisocyanate, 4,4'-methylenebis (cyclohexyl isocyanate), methyl-2,4-cyclohexane diisocyante, methyl-2,6-cyclohexane diisocyanate, 1,4-bis (isocyanatomethyl)cyclohexane, 1,3-bis(isocyanatomethyl) cyclohexane, dicyclohexyl-4,4-methane-diisocyanate, phenylene diisocyanate, 4,4'-diphenyl diisocyanate, 1,5-naphthalene diisocyanate, 3,3,5-trimethyl-1-isocyanate-3-isocyanatomethylcyclohexane, di(2 -isocyanatoethyl) bicyclo[2,2,1]-hepto-5-ene-2,3-dicarboxylate, 4,4'-toluidine diisocyanate, dianisidine diisocyanate, 4,4'-diphenylether diisocyanate, ω,ω'-diisocyanato-1,4-diethylbenzene, 1,3-tetramethylxylylene diisocyanate, 1,4-tetramethylxylylene diisocyanate, hydrogenated diphenylmethane diisocyanate, hydrogenated tolylene diisocyanate, and hydrogenated xylylene diisocyanate. Isocyanate trimers such as biuret, isocyanurate and adduct can also be used.

Polybasic acid anhydride which can be used for the binder in the invention include, for example, maleic anhydride, succinic anhydride, itaconic anhydride, glutaric anhydride, adipic anhydride, phthalic anhydride, citraconic anhydride, trimellitic anhydride, pyromellitic anhydride, 2,3-benzophenonedicarboxylic anhydride, 3,4-benzophenonedicarboxylic anhydride, 2,3-dicarboxyphenyl-phenyl-ether anhydride, 3,4-dicarboxyphenyl-phenyl-ether anhydride, 3,4-biphenyldicarboxylic anhydride, 2,3-dicarboxyphenyl-phenyl-sulfonic anhydride, 2,3-dicarboxyphenyl-phenyl-sulfide anhydride, 1,2-naphthalenedicarboxylic anhydride, 2,3-naphthalenedicarboxylic anhydride, 1,8-naphthalenedicarboxylic anhydride, 2,3- anthracenedicarboxylic anhydride, 1,9-anthracenedicarboxylic anhydride, ethylenetetracarboxylic dianhydride, cyclopentanetetracarboxylic dianhydride, 3,3',4,4'-benzophenonetetracarboxylic dianhydride, 2,2',3,3'-benzophenonetetracarboxylic dianhydride, 3,3',4,4'-biphenyltetracarboxylic dianhydride, 2,2',3,3'-biphenyltetracarboxylic dianhydride, 2,2'-bis(3,4-dicarboxyphenyl)propane dianhydride, bis(3,4-dicarboxylicphenyl)ether dianhydride, bis (3,4-dicarboxyphenyl)sulfonic dianhydride, 1,1-bis (2,3-dicarboxyphenyl)ethane dianhydride, bis(2,3-dicarboxyphenyl) methane dianhydride, 1,1-bis(3,4-dicarboxyphenyl)methane dianhydride, bis(3,4-dicarboxyphenyl)methane dianhydride, 2,3,6,7-naphthalenetetracarboxylic dianhydride, 1,4,5,8-naphthalenetetracarboxylic dianhydride, 1,2,5,6-naphthalenetetracarboxylic dianhydride, 1,2,3,4-benzenetetracarboxylic dianhydride, 3,4,9,10-perylenetetracarboxylic dianhydride, 2,3,6,7-anthracenetetracarboxylic dianhydride, and 1,2,7,8-phenanthrenetetracarboxylic dianhydride.

Cyclic iminoester compounds which can be used for a binder in the invention are oxazolone compounds having a five membered iminoester ring and oxazinone compounds or benzooxazinone compounds having a six membered iminoester ring.

Oxazolone compounds include, for example, 2-oxazoline-5-one, 3-oxazoline-5-one, 2-oxazoline-4-one, 3-oxazoline-2-one, 4-oxazoline-2-one, 4-methyl-2-oxazoline-5-one, 2-methyl-3-oxazoline-5-one, 5-methyl-2-oxazoline-4-one, 5-methyl-3-oxazoline-2-one, 2,2'-bis[5(4H)-oxazolone], 2,2'-methylenebis[5(4H)-oxazolone], 2,2'-ethylenebis[5 (4H)-oxazolone], 2,2'-tetramethylenebis[5(4H)-oxazolone], 2,2'-hexamethylene-bis[5(4H)-oxazolone], 2,2'-decamethylenebis [5 (4H) -oxazolone], 2,2'-p-phenylenbis [5(4H)-oxazolone], 2,2'-m-phenylenebis[5(4H)-oxazolone], 2,2'-naphthalenebis[5(4H) -oxazolone], 2,2'-diphenylenebis [5(4H)-oxazolone], 2,2'-(1,4-cyclohexylene)-bis[5(4H)-oxazolone], 2,2'-bis[4-methyl-5 (4H)-oxazolone], 2,2'-methylenebis[4-methyl-5 (4H)-oxazolone], 2,2'-ethylenebis[4-methyl-5(4H)-oxazolone], 2,2'-tetramethylenebis[4-methyl-5(4H)-oxazolone], 2,2'-hexamethylenebis[4-methyl-5(4H)-oxazolone], 2,2'-decamethylenebis[4-methyl-5 (4H) -oxazolone], 2,2'-p-phenylenebis [4-methyl-5 (4H) -oxazolone], 2,2'-m-phenylenebis[4-methyl-5 (4H) -oxazolone], 2,2'-naphthalenebis[4-methyl-5(4H)-oxazolone], 2,2'-diphenylenebis[4-methyl-5(4H) -oxazolone], 2,2'-(1,4-cyclohexylene)bis[4-methyl-5(4H)-oxazolone], 2,2'-bis [4,4-dimethyl-5(4H)-oxazolone], 2,2'-methylenebis [4,4-dimethyl-5 (4H) -oxazolone], 2,2'-ethylenebis [4,4-dimethyl-5(4H) -oxazolone], 2,2'-tetramethylenebis[4,4-dimethyl-5(4H)-oxazolone], 2,2'-hexamethylenebis [4,4-dimethyl-5(4H)-oxazolone], 2,2'-octamethylenebis[4,4-dimethyl-S(4H)-oxazolone], 2,2'-decamethylenebis[4,4-dimethyl-5 (4H) -oxazolone], 2,2'-p-phenylenebis[4,4-dimethyl-5 (4H) -oxazolone], 2,21-m-phenylenebis [4,4-dimethyl-5(4H)-oxazolone], 2,2'-naphthalenebis[4,4-dimethyl-5(4H) -oxazolone], 2,2'-diphenylenebis[4,4-dimethyl-S(4H)-oxazolone], 2,2'-(1,4-cyclohexylene)bis[4,4-dimethyl-5(4H)-oxazolone, 2,2'-bis[4-isopropyl-5(4H)-oxazolone], 2,2'-methylenebis[4-isopropyl-5(4H)-oxazolone], 2,2'-ethylenebis[4-isopropyl-5 (4H)-oxazolone], 2,2'-tetramethylenebis[4-isopropyl-S(4H)-oxazolone], 2,2'-hexamethylenebis(4-isopropyl-5(4H)-oxazolone], 2,2'-p-phenylenebis[4-isopropyl-5(4H)-oxazolone], 2,2'-m-phenylenebis[4-isopropyl-5(4H)-oxazolone], 2,21 -naphthalenebis [4-isopropyl-5 (4H)-oxazolone], 2,2'-bis[4-isobutyl-5 (4H) -oxazolone], 2,2'-methylenebis[4-isobutyl-5(4H)-oxazolone], 2,2'-ethylenebis (4-isobutyl-5(4H) -oxazolone], 2,2'-tetramethylenebis[4-isobutyl-5(4H)-oxazolone], 2,2'-hexamethylenebis[4-isobutyl-5(4H)-oxazolone], 2,2'-p-phenylenebis[4-isobutyl-5(4H) -oxazolone], 2,2'-m-phenylenebis [4-isobutyl-5(4H)-oxazolone] and 2,2'-naphthalenebis[4-isobutyl-5(4H)-oxazolone].

2-oxazoline-5-one and 2,2'-bis[5 (4H) -oxazolone] are particularly preferred of these cyclic imino ester compounds.

Exemplary oxazinone compounds include 2,2'-bis(3,1-benzoxazine-4-one), 2,2'-methylenebis(3,1-benzoxazine-4-one), 2,2'-ethylenebis(3,1-benzoxazine-4-one), 2,2'-tetramethylenebis (3,1-benzoxazine-4-one), 2,2'-hexamethylenebis (3,1-benzoxazine-4-one), 2,2'-decamethylenebis (3,1-benzoxazine-4-one), 2,2'-p-phenylenebis (3,1-benzoxazine-4-one), 2,2'-m-phenylenebis (3,1-benzoxazine-4-one), 2,2'-naphthalenebis(3,1-benzoxazine-4-one), 2,2'-(4,4'-diphenylene)bis(3,1-benzoxazine-4-one), 2,2'-bis (4,5-dihydro-1,3,6H-oxazine-6-one), 2,2'-methylenebis(4,5-dihydro-1,3,6H-oxazine-6-one), 2,2'-ethylenebis(4,5-dihydro-1,3,6H-oxazine-6-one), 2,2'-tetramethylenebis(4,5-dihydro-1,3,6H-oxazine-6-one), 2,2'-p-phenylenebis(4,5-dihydro-1,3,6H-oxazine-6-one), 2,2'-m-phenylenebis(4,5-dihydro-1,3,6H-oxazine-6-one), 2,2'-bis(4-methyl-5-hydro-1,3,6H-oxazine-6-one), 2,2'-methylenebis(4-methyl-5-hydro-1,3,6H-oxazine-6-one), 2,2'-ethylenebis(4-methyl-5-hydro-1,3,6H-oxazine-6-one), 2,2'-p-phenylenebis(4-methyl-5-hydro-1,3,6H-oxazine-6-one), 2,2'-m-phenylenebis(4-methyl-5-hydro-1,3,6H-oxazine-6-one), 2,2'-p-phenylenebis(4-hydro-5-methyl-1,4,6H-oxazine-6-one), and 2,2'-m-phenylenebis(4-hydro-5-methyl-1,3,6H-oxazine-6-one). 2,2'-bis(3,1-benzoxazine-6-one) is most preferably in these compounds.

Benzoxazinone compounds include, for example, 2,8-dimethyl-4H,6H-benzo[1,2-d:5,4-d']-bis[[1,3]-oxazine-4,6-dione], 2,7-dimethyl-4H,9H-benzo[1,2-d:4,5-d']-bis[[1,3]-oxazine-4,9-dione], 2,8-diphenyl-4H,8H-benzo[1,2-d:5,4-d']-bis[[1,3]-oxazine-4,6-dione], 2,7-diphenyl-4H,9H-benzo [1,2-d: 4,5-d']-bis[[1,3]-oxazine-4,6-dione], 6,6'-bis(2-methyl-4H,3,1-benzoxazine-4-one), 6,6'-bis(2-ethyl-4H,3,1-benzoxazine-4-one), 6,6'-bis(2-phenyl-4H,3,1-benzoxazine-4-one), 6,6'-methylene-bis(2-methyl-4H,3,1-benzoxazine-4-one), 6,6'-methylenebis(2-phenyl-4H,3,1-benzoxazine-4-one), 6,6'-ethylenebis(2-methyl-4H,3,1-benzoxazine-4-one), 6,6'-ethylenebis(2-phenyl-4H,3,1-benzoxazine-4-one), 6,6'-butylenebis (2-methyl-4H,3,l-benzoxazine-4-one), 6,6'-butylenebis (2-phenyl-4H,3,1-benzoxazine-4-one), 6,6'-oxybis(2-methyl-4H,3,1-benzoxazine-4-one), 6,6'-oxybis(2-phenyl-4H,3,1-benzoxazine-4-one), 6,6'-sulfonylbis(2-methyl-4H,3,1-benzoxazine-4-one), 6,6'-sulfonylbis(2-phenyl-4H,3,1-benzoxazine-4-one), 6,6'-carbonylbis(2-methyl-4H,3,1-benzoxazine-4-one), 6,6'-carbonylbis(2-phenyl-4H,3,1-benzoxazine-4-one), 7,7'-methylene-bis(2-methyl-4H,3,1-benzoxazine-4-one), 7,7'-methylenebis(2-phenyl-4H,3,1-benzoxazine-4-one), 7,7'-bis(2-methyl-4H,3,1-benzoxazine-4-one), 7,7'-ethylenebis(2-methyl-4H,3,1-benzoxazine-4-one), 7,7'-oxybis(2-methyl-4H,3,1-benzoxazine-4-one), 7,7'-sulfonylbis (2-methyl-4H,3,1-benzoxazine-4-one) and 7,7'-carbonylbis (2-methyl-4H,3,1-benzoxazine-4-one). The most preferred compound is 2,8-dimethyl-4H,6H-benzo[1,2-d:5,4-d']-bis[[1,3]-oxazine-4,6-dione].

Cyclic iminoether compounds which can be used as a binder in the invention are oxazoline compounds having a five membered iminoether ring and oxazine compound having a six membered iminoether ring.

Oxazoline compounds include, for example, 2-oxazoline, 4-methyl-2-oxazoline, 5-methyl-2-oxazoline, 4,5-dimethyl-2-oxazoline, 2,2'-bis(2-oxazoline), 2,2'-bis(4-methyl-2-oxazoline), 2,2'-bis(4-ethyl-2-oxazoline), 2,2'-bis(4,4'-diethyl-2-oxazoline), 2,2'-bis(4-propyl-2-oxazoline), 2,2'-bis (4-butyl-2-oxazoline, 2,2'-bis(4-hexyl-2-oxazoline), 2,2'-bis (4-cyclohexyl-2-oxazoline), 2,2'-bis(4-phenyl-2-oxazoline), 2,2'-bis(4-benzyl-2-oxazoline), 2,2'-o-phenylenebis(2-oxazoline), 2,2'-m-phenylenebis(2-oxazoline), 2,2'-p-phenylenebis(2-oxazoline), 2,2'-o-phenylenebis(4-methyl-2-oxazoline), 2,2'-m-phenylenebis(4-methyl-2-oxazoline), 2,2'-p-phenylenebis (4-methyl-2-oxazoline), 2,2'-o-phenylenebis(4,4'-dimethyl-2-oxazoline), 2,2'-m-phenylenebis(4,4'-dimethyl-2-oxazoline), 2,2'-p-phenylenebis(4,4'-dimethyl-2-oxazoline), 2,2'-ethylenebis(2-oxazoline), 2,2'-tetramethylenebis(2-oxazoline), 2,2'-hexamethylenebis(2-oxazoline), 2,2'-octamethylenebis(2-oxazoline), 2,2'-decamethylenebis(2-oxazoline), 2,2'-ethylenebis(4-methyl-2-oxazoline), 2,2'-tetramethylenebis (4,4'-dimethyl-2-oxazoline), 2,2', 9,9'-diphenoxyethanebis (4,4'-dimethyl-2-oxazoline) and 2,2'-cyclohexylenebis (2-oxazoline). 2,2'-bis(2-oxazoline) is the most preferred of these oxazoline compounds.

Oxazine compounds include, for example, 1,2-oxazine, 2,2'-bis(5,6-dihydro-4H-1,3-oxazine), 2,2'-methylenebis(5, 6-dihydro-4H-1,3-oxazine), 2,2'-ethylenebis(5,6-dihydro-4H-1,3-oxazine), 2,2'-propylenebis(5,6-dihydro-4H-1,3-oxazine), 2,2'-butylenebis (5,6-dihydro-4H-1,3-oxazine), 2,2'-hexamethylenebis (5,6-dihydro-4H-1,3-oxazine), 2,2'-p-phenylenebis (5,6-dihydro-4H-1,3-oxazine), 2,2'-m-phenylenebis (5,6-dihydro-4H-1,3-oxazine), 2,2'-naphthylenebis (5,6-dihydro-4H-1,3-oxazine) and p,p'-diphenylenebis (5,6-dihydro-4H-1,3-oxazine. 2,2'-bis(5,6-dihydro-4H-1,3-oxazine) is the most preferred of these oxazine compounds.

Exemplary aromatic hydroxycarboxylic acids which can be used as a binder in the invention include, o-hydroxybenzoic acid, m-hydroxybenzoic acid, p-hydroxybenzoic acid, 1-carboxy-2-hydroxynaphthalene, 1-carboxy-3-hydroxynaphthalene, 1-carboxy-4-hydroxynaphthalene, 1-carboxy-5-hydroxynaphthalene, 1-carboxy-6-hydroxynaphthalene, 1-carboxy-7-hydroxynaphthalene, 1-carboxy-8-hydroxynaphthalene, 1-hydroxy-2-carboxynaphthalene, 1-hydroxy-3-carboxynaphthalene, 1-hydroxy-6-carboxynaphthalene, 1-hydroxy-7-carboxynaphthalene, 2-carboxy-3-hydroxynaphthalene, 2-carboxy-6-hydroxynaphthalene, 2-carboxy-7-hydroxynaphthalene, 3-carboxy-3'-hydroxybiphenyl, 3-carboxy-4'-hydroxybiphenyl, 3-hydroxy-4'-carboxybiphenyl and 4-carboxy-4'-hydroxybiphenyl.

Polyamino compounds which can be used as a binder in the invention include, for example, 1,4-diaminobenzene, 1,3-diaminobenzene, 1,2-diaminobenzene, 2,3-diaminotoluene, 2,4-diaminotoluene, 2,5-diaminotoluene, 2,6-diaminotoluene, 1,2-diaminoethane, 1,2-diaminopropane, 1,3-diaminopropane, 1,2-diaminobutane, 1,3-diaminobutane, 1,4-diaminobutane, 1,3-diamino-2-methylpropane, 4,4'-diaminobiphenyl, 3,4'-diaminobiphenyl, 3,3'-diaminobiphenyl, bis(3-aminophenoxy) methane, bis(4-aminophenoxy)methane, bis (3-aminophenoxy)ethane, bis(4-aminophenoxy)ethane, 2,2-bis(3-aminophenoxy)propane, 2,2-bis(4-aminophenoxy) propane, bis(3-aminophenoxy)ether, bis(4-aminophenoxy) ether, bis(3-aminophenoxy)ketone, bis(4-aminophenoxy) ketone, bis(3-aminophenoxy)sulfone, bis(4-aminophenoxy) sulfone, bis(3-aminophenoxy)sulfide, bis(4-aminophenoxy) sulfide, bis(3-aminophenoxy)sulfoxide, bis(4-aminophenoxy)sulfoxide, melamine, 1,2,3-triaminobenzene, 1,2,4-triaminobenzene, 1,3,5-triaminobenzene, 1,2,3-triaminocyclohexane, 1,2,4-triaminocyclohexane, 1,3,5-triaminocyclohexane, 1,2,3-triaminonaphthalene, 1,2,4-triaminonaphthalene, 1,2,5-triaminonaphthalene, 1,2,6-triaminonaphthalene, 1,2,7-triaminonaphthalene, 1,2,8-triaminonaphthalene, 1,3,5-triaminonaphthalene, 1,3,6-triaminonaphthalene, 1,3,7-triaminonaphthalene, 1,3,8-triaminonaphthalene, 1,4,5-triaminonaphthalene, 1,4,6-triaminonaphthalene, 1,4,7-triaminonaphthalene, 1,6,7-triaminonaphthalene, 1,6,8-triaminonaphthalene, 2,3,6-triaminonaphthalene, 2,3,7-triaminonaphthalene, 3,3'-diaminobenzidine, 1,2,3,4-tetraaminobenzene, 1,2,3,5-tetraaminobenzene, 1,2,4,5-tetraaminobenzene, 3,3',4,4'-tetraaminophenyl ether, 3,3',4,4'-tetraaminophenyl sulfone and 3,3',4,4'-tetraaminophenyl ketone.

Polyhydric alcohols which can be used as a binder in the invention include, for example, ethylene glycol, 1,3-propanediol, 1,2-propanediol, 1,4-butanediol, 1,3-butanediol, 1,2-butanediol, 1,2-butanediol, 1,2-pentanediol, 1,3-pentanediol, 1,4-pentanediol, 1,5-pentanediol, 2,3-pentanediol, 2,4-pentanediol, 1,6-hexanediol, 1,5-hexanediol, 1,4-hexanediol, 1,3-hexanediol, 1,2-hexanediol, 2,3-hexanediol, 2,4-hexanediol, 2,5-hexanediol, 3,5-hexanediol, 1,10-decanediol, neopentyl glycol, 2,2,4-trimethyl-1,3-pentanediol, 3-methyl-1,5-pentanediol, 3,3-dimethyl-1,3-propanediol, 1,4-cyclohexanedimethanol, 1,4-benzenedimethanol, polymethylene glycol, polyethylene glycol, polyvinyl alcohol, polyhydroxyethyl methacrylate, polyhydroxypropyl methacrylate, glycerol, trimethylolethane, trimethylolpropane, trimethylolbutane, trimethylolpentane, pentaerythritol, sorbitol, castor oil, hydrogenated bisphenol-A, bisphenol dihydroxypropyl ether, 1,3,5-(trihydroxymethyl)pentane, 1,3,3,5-tetra (hydroxymethyl) pentane, 1,2,6-trihydroxyhexane and 1,2, 2,6-tetrahydroxyhexane. Other polyhydric alcohols include arabinose, ribose, deoxyribose, xylose, glucose, fructose, mannose, galactose and other saccharides; and olisaccharide, oligosaccharide and polysaccharide which are condensation products of these saccharides. When optical activity is present, any of D-, L-, and DL-isomer can be used.

Exemplary epoxy compounds which can be used for a binder in the invention include ethylene oxide, propylene oxide, butylene oxide, styrene oxide, butyl glycidyl ether, allyl glycidyl ether, phenyl glycidyl ether, epichlorohydrin, cyclohexane vinyl monoxide, dipentene monoxide, cresyl glycidyl ether, α-pinene oxide, glycidyl methacrylate, butadiene monoepoxide, 1,2-epoxy-7-octene, glycidyl acrylate, glycidyl undecylate methylvinylglycidylamine, vinyl-3,4-epoxycyclohexane, allyl-3,4-epoxycyclohexane, 3,4-epoxycyclohexyl acrylate, 2,3-epoxypropylyl 4-vinylphenyl ether, 2,3-epoxycinnamyl acrylate, 9,10-epoxyoleyl acrylate, acrylate, 2,3-epoxybutyl methacrylate, methylglycidyl methacrylate, bisphenol-A glycidyl ether, ethylene glycol diglycidyl ether, 1,4-butanediol diglycidyl ether, aryl glycidyl ether, 3,4-epoxycyclohexylmethyl methacrylate, glycerol diglycidyl ether, ethylene glycol diglycidyl ether, propylene glycol diglycidyl ether, resorcinol diglycidyl ether, neopentyl glycol diglycidyl ether, 1,6-hexanediol diglycidyl ether, hydroquinone diglycidyl ether, bisphenol-S diglycidyl ether, diglycidyl adipate, diglycidyl o-phthalate, diglycidyl terephthalate, sorbitol polyglycidyl ether, sorbitan polyglycidyl ether, polyglycerol polyglycidyl ether, pentaerythritol polyglycidyl ether, diglycerol polyglycidyl ether, trimethylolpropane polyglycidyl ether, polyethylene glycol diglycidyl ether, polypropylene glycol diglycidyl ether, and polytetramethylene glycol diglycidyl ether.

Glycidyl acrylate and glycidyl methacrylate are most preferred of these epoxy compounds in view of handling with ease, low price, compatibility and low vapor pressure.

Polyfunctional aziridine compounds which can be used as a binder in the invention include, for example, 2,2-bishydroxymethylbutanoltris[3-(1-aziridinyl)propionate], ethyleneglycolbis[3-(1-aziridinyl)propionate], polyethyleneglycolbis[3-(1-aziridinyl)propionate], propyleneglycolbis[3-(1-aziridinyl)propionate], polypropyleneglycolbis[3(1-aziridinyl) propionate], tetramethyleneglycolbis[3-(1-aziridinyl) propionate] and polytetramethyleneglycolbis[3-(1-aziridinyl) propionate].

Lactam compounds which can be used as a binder in the invention include, for example, ε-caprolactam, ω-laurolactam, 2-pyrrolidone, 2-piperidone, 2-azacyclobutanone, 2-azacyclooctanone, 2-azacyclononanone, glycocyamidine, oxindol, isatin and N,N'-terephthalylbiscaprolactam.

Lactone compounds which can be used as a binder in the invention include, for example, glycolide, lactide, 1,4-dioxanone, ε-caprolactone, 1,5-dioxysepane-2-one, trimethylene carbonate, β-butyrolactone, β-propiolactone, δ-valerolactone, γ-butyrolactone, enantholactone, caprololactone, β-methylpropiolactone, β-dimethylpropiolactone, δ-caprylactone, ethylene oxalate, ethylene malonate, ethylene succinate, ethylene adipate, propylene oxalate, propylene malonate, propylene succinate, propylene adipate, tetramethylene oxalate, tetramethylene malonate, tetramethylene succinate, tetramethylene asipate, [o-α-D-glucopyranosyl-(1→4)-4-D'-glucono-1,5-lactone and β-methyl-α-valerolactone.

Another effective binder is diethylene glycol bischloroformate.

The amount of the binder depends upon the kind and molecular weight of the polyhydroxycarboxylic acid at the time of binder addition and the kind of binder. The amount is in the range of usually 0.0001 to 10% by weight, preferably 0.001 to 8% by weight, more preferably 0.01 to 5% by weight, most preferably 0.5 to 3% by weight of polyhydroxycarboxylic acid. An amount of the binder exceeding 10% by weight decreases molecular weight on the contrary, or preferentially leads to mutual reaction of the binder and eliminates the effect of binder addition. Further, a substantial amount of the binder is liable to impair the natural environment after degradation of the polyhydroxycarboxylic acid.

The water content of the reaction mixture at the time of binder addition must be 50 ppm or less, and is preferably 20 ppm or less, most preferably 5 ppm or less.

Accordingly, the dehydration polycondensation reaction is carried out while distilling the generated water together with the organic solvent out of the reaction system. An organic solvent containing 50 ppm or more of water leads to the reaction between moisture and the binder.

The reaction temperature after addition of the binder depends upon the kind of the solvent and polyhydroxycarboxylic acid, and is in the range of generally 50° to 250° C., preferably 60° to 220° C., more preferably 80° to 200° C., furthermore preferably 90° to 160° C., most preferably 100° to 140° C. A reaction temperature below 50° C. cannot progress the reaction sufficiently. On the other hand, a reaction temperature exceeding 250° C. tends to cause discoloration or deterioration of polyhydroxycarboxylic acid. The reaction after addition of the binder can be carried out under reduced pressure, atmospheric pressure, or increased pressure. The reaction is preferably carried out in an inert gas atmosphere so as to prevent water penetration from outside of the reaction system, and can also be carried out while ventilating or bubbling the inert gas.

The reaction time after addition of the binder is preferably in the range of 0.1 to 5 hours. A reaction time less than 0.1 hour cannot expect satisfactory effect depending upon reaction conditions. On the other hand, a reaction time exceeding 5 hours suspends further increase in the molecular weight of polyhydroxycarboxylic acid and thus further effect cannot be expected by extension of the reaction time.

High molecular weight polyhydroxycarboxylic acid having an weight average molecular weight of 100,000 or more can be prepared in a short time by the above process. Polyhydroxycarboxylic acid obtained by the process of the invention can be isolated and purified by known procedures, for example, cooling and crystallization in the solvent used for the polycondensation reaction, filtration, successive washing with methanol, and drying.

EXAMPLE

The present invention will hereinafter be illustrated by way of examples. However, the method and equipment described below are not to be construed to limit the scope of the invention.

The molecular weight of the polymer in the invention was measured by GPC (gel permeation chromatography) using a polystyrene standard sample as a reference. Conditions for GPC analysis were as follows:
GPC: Shodex System 1 (manufactured by Showa Denko Co.)
Column: K-805×2 K-800P (Precolumn)
Column temperature: 40° C.
Solvent: chloroform
Flow rate: 1.0 ml/min
Sample concentration: 3 mg/ml
Amount of sample: 100 gl

EXAMPLE 1

After heating 75.0 g of 90% L-lactic acid at 150° C. with stirring for 3 hours under reduced pressure of 50 mmHg while removing water out of the reaction system, 325 g of o-dichlorobenzene and 0.4 g of tin powder were added. A tube packed with 75 g of molecular sieve 3A was mounted on the reaction vessel so as to return the distilled solvent to the reaction system after passing through the molecular sieve. The reaction conditions were set at 140° C. under reduced pressure of 250 mmHg and the reaction was carried out.

After reacting for 12 hours, a sample was taken was out and the molecular weight was measured to give an weight average molecular weight of 80,000. To the reaction mass, 0.75 g of xylene diisocyanate was added and the reaction was continued at 140° C. in a nitrogen atmosphere under atmospheric pressure. The viscosity of the reaction mass rapidly increased and the reaction was finished after 2 hours from the addition of xylene diisocyanate.

After finishing the reaction, the reaction mass was dissolved by adding 400 ml of chloroform and suction-filtered to remove tin powder. To the chloroform solution thus obtained 1,400 ml of methanol was added and the precipitated light yellow solid was filtered and dried. The polymer obtained had a weight average molecular weight of 200,000.

EXAMPLE 2

The same procedures as described in Example 1 were carried out except that o-dichlorobenzene was replaced by 325 g of n-xylene and the reaction immediately before the addition of xylene diisocyanate was carried out at 140° C. in a nitrogen atmosphere. The weight average molecular weight was 70,000 immediately before the addition of xylene diisocyanate. The polymer isolated after reacting for 2 hours from the addition of xylene diisocyanate had a weight average molecular weight of 190,000.

EXAMPLE 3

The same procedures as described in Example 1 were carried out except that o-dichlorobenzene was replaced by 325 g of diphenyl ether and the reaction immediately before the addition of xylene diisocyanate was carried out at 130° C. under reduced pressure of 15 mmHg. The weight average molecular weight immediately before the addition of xylene diisocyanate was 89,000 and the polymer isolated after reacting for 2 hours from the addition of xylene diisocyanate had a average molecular weight of 210,000.

EXAMPLE 4

The same procedures as described in Example 1 were carried out except that o-dichlorobenzene was replaced by 325 g of naphthalene and the reaction immediately before the addition of xylene diisocyanate was carried out at 130° C. under reduced pressure of 50 mmHg. The weight average molecular weight immediately before the addition of xylene diisocyanate was 65,000 and the polymer isolated after reacting for 2 hours from the addition of xylene diisocyanate had an weight average molecular weight of 184,000.

EXAMPLE 5

The same procedures as described in Example 1 were carried out except that o-dichlorobenzene was replaced by 325 g of n-butyl benzoate and the reaction immediately before the addition of xylene diisocyanate was carried out at 140° C. under reduced pressure of 25 mmHg. The weight average molecular weight immediately before the addition of xylene diisocyanate was 65,000. The polymer isolated after reacting for 2 hours from the addition of xylene diisocyanate had a weight average molecular weight of 169,000.

EXAMPLE 6

The same procedures as described in Example 1 were carried out except that o-dichlorobenzene was replaced by 325 g of cyclohexyl ketone and the reaction immediately before the addition of xylene diisocyanate was carried out at 140° C. under reduced pressure of 10 mmHg. The weight average molecular weight immediately before the addition of xylene diisocyanate was 68,000. The polymer isolated after reacting for 2 hours from the addition of xylene diisocyanate had a weight average molecular weight of 173,000.

EXAMPLE 7

The same procedures as described in Example 1 were carried out except that xylene diisocyanate was replaced by 0.75 g of 2,4-tolylene diisocyanate. The weight average molecular weight immediately before the addition of 2,4-tolylene diisocyanate was 80,000, and the polymer isolated after reacting for 2 hours from the addition of 2,4-tolylene diisocyanate had a weight average molecular weight of 226,000.

EXAMPLE 8

The same procedures as described in Example 1 were carried out except that the reaction time before the addition of xylene diisocyanate was 20 hours and 0.375 g of xylene diisocyanate was added. The weight average molecular weight immediately before the addition of xylene diisocyanate was 150,000, and the polymer isolated after reacting for 2 hours from the addition of xylene diisocyanate had a weight average molecular weight of 305,000.

EXAMPLE 9

The same procedures as described in Example 1 were carried out except that the reaction time before the addition of xylene diisocyanate was 18 hours and the added amount of xylene diisocyanate was 0.53 g. The weight average molecular weight immediately before the addition of xylene diisocyanate was 120,000, and the polymer isolated after reacting for 2 hours from the addition of xylene diisocyanate had a weight average molecular weight of 237,000.

EXAMPLE 10

The same procedures as described in Example 1 were carried out except that the reaction time before the addition of xylene diisocyanate was 15 hours and the added amount of xylene diisocyanate was 0.6 g. The weight average molecular weight immediately before the addition of xylene diisocyanate was 100,000, and the polymer isolated after reacting for 2 hours from the addition of xylene diisocyanate had a weight average molecular weight of 196,000.

EXAMPLE 11

The same procedures as described in Example 1 were carried out except that the reaction time before the addition of xylene diisocyanate was 8 hours and the added amount of xylene diisocyanate was 2.25 g. The weight average molecular weight immediately before the addition of xylene diisocyanate was 50,000, and the polymer isolated after reacting for 2 hours from the addition of xylene diisocyanate had a weight average molecular weight of 150,000.

EXAMPLE 12

The same procedures as described in Example 1 were carried out except that the added amount of xylene diisocyanate was 1.5 g. The weight average molecular weight immediately before the addition of xylene diisocyanate was 80,000, and the polymer isolated after reacting for 2 hours from the addition of xylene diisocyanate had a weight average molecular weight of 153,000.

EXAMPLE 13

The same procedures as described in Example 1 were carried out except that the added amount of xylene diisocyanate was 2.25 g. The weight average molecular weight immediately before the addition of xylene diisocyanate was 80,000, and the polymer isolated after reacting for 2 hours from the addition of xylene diisocyanate had a weight average molecular weight of 104,000.

EXAMPLE 14

The same procedures as described in Example 1 were carried out except that L-lactic acid was replaced by 81 g of 70% glycolic acid. The weight average molecular weight immediately before the addition of xylene diisocyanate was 68,000, and the polymer isolated after reacting for 2 hours from the addition of xylene diisocyanate had a weight average molecular weight of 185,000.

EXAMPLE 15

The same procedures as described in Example 1 were carried out except that L-lactic acid was replaced by 75 g of 90% DL-lactic acid. The weight average molecular weight immediately before the addition of xylene diisocyanate was 70,000, and the polymer isolated after reacting for 2 hours from the addition of xylene diisocyanate had a weight average molecular weight of 206,000.

EXAMPLE 16

The same procedures as described in Example 1 were carried out except that L-lactic acid was replaced by 67.5 g of 90% L-lactic acid and 8.1 g of 70% glycolic acid. The weight average molecular weight immediately before the addition of xylene diisocyanate was 78,000, and the polymer isolated after reacting for 2 hours from the addition of xylene diisocyanate had a weight average molecular weight of 198,000.

EXAMPLE 17

After heating 75.0 g of 90% L-lactic acid at 150° C. with stirring for 3 hours under reduced pressure of 50 mmHg while removing water out of the reaction system, 325 g of diphenyl ether and 0.4 g of tin powder were added. A tube packed with 75 g of molecular sieve 3A was mounted on the reaction vessel so as to return the distilled solvent to the reaction system, after passing through the molecular sieve. The reaction conditions were set at 130° C. under reduced pressure of 15 mmHg and the reaction was carried out.

After reacting for 10 hours, a sample was taken out and a molecular weight was measured to give a weight average molecular weight of 50,000. To the reaction mass, 0.7 g of pyromellitic dianhydride was added and the reaction was continued in a nitrogen atmosphere at 130° C. under atmospheric pressure. The viscosity of the reaction mass was rapidly increased and the reaction was finished after 2 hours from the addition of pyromellitic dianhydride.

The reaction mass was dissolved in 400 ml of chloroform, and suction filtered to remove tin powder. To the chloroform solution, 1,400 ml of methanol was added. The precipitated light yellow solid was filtered and dried to obtain polymer having a weight average molecular weight of 300,000.

EXAMPLE 18

The same procedures as described in Example 17 were carried out except that pyromellitic dianhydride was replaced by 0.75 g of 3,3', 4,4'-benzophenonetetracarboxylic dianhydride. The weight average molecular weight immediately before the addition of 3,3', 4,4'-benzophenonetetracarboxylic dianhydride was 50,000, and the polymer isolated after reacting for 2 hours from the addition of 3,3', 4,4'-benzophenonetetracarboxylic dianhydride had a weight average molecular weight of 250,000.

EXAMPLE 19

The same procedures as described in Example 17 were carried out except that L-lactic acid was replaced by 81 g of 70% glycolic acid. The weight average molecular weight immediately before the addition of pyromellitic dianhydride was 51,000, and the polymer isolated after reacting for 2 hours from the addition of pyromellitic dianhydride had a weight average molecular weight of 270,000.

EXAMPLE 20

The same procedures as described in Example 17 were carried out except that L-lactic acid was replaced by 75 g of 90% DL-lactic acid. The weight average molecular weight immediately before the addition of pyromellitic dianhydride was 54,000, and the polymer isolated after reacting for 2 hours from the addition of pyromellitic dianhydride had a weight average molecular weight of 295,000.

EXAMPLE 21

The same procedures as described in Example 17 were carried out except that the reaction time before the addition of pyromellitic dianhydride was 15 hours. The weight average molecular weight immediately before the addition of pyromellitic dianhydride was 100,000, and the polymer isolated after reacting for 2 hours from the addition of pyromellitic dianhydride had a weight average molecular weight of 320,000.

EXAMPLE 22

After heating 75.0 g of 90% L-lactic acid at 150° C. with stirring for 3 hours under reduced pressure of 50 mmHg while removing water out of the reaction system, 325 g of diphenyl ether and 0.4 g of tin powder were added. A tube packed with 75 g of molecular sieve 3A was mounted on the reaction vessel so as to return the distilled solvent to the reaction system, after passing through the molecular sieve. The reaction conditions were set at 130° C. under reduced pressure of 15 mmHg and the reaction was carried out.

After reacting for 10 hours, a sample was taken out and a molecular weight was measured to give a weight average molecular weight of 50,000. To the reaction mass, 0.75 g of 2,2'-bis[5(4H)-oxazolone] was added and the reaction was continued in a nitrogen atmosphere at 130° C. under atmospheric pressure. The viscosity of the reaction mass was rapidly increased and the reaction was finished after 2 hours from the addition of 2,2'-bis[5(4H)-oxazolone].

The reaction mass was dissolved in 400 ml of chloroform, and suction filtered to remove tin powder. To the chloroform solution, 400 ml of methanol was added. The precipitated light yellow solid was filtered and dried to obtain polymer having a weight average molecular weight of 200,000.

EXAMPLE 23

The same procedures as described in Example 22 were carried out except that 2,2'-bis[5(4H)-oxazolone] was replaced by 0.75 g of 2,2'-bis(3,1-benzoxazine-4-one). The weight average molecular weight immediately before the addition of 2,2'-bis(3,1-benzoxazine-4-one) was 50,000, and the polymer isolated after reacting for 2 hours from the addition of 2,2'-bis(3,1-benzoxazine-4-one) had a weight average molecular weight of 230,000.

EXAMPLE 24

The same procedures as described in Example 22 were carried out except that 2,2'-bis[5(4H)-oxazolone] was replaced by 0.75 g of 2,8-dimethyl-4H,6H-benzo[1,2-d:5,4-d']bis-[1,3]-oxazine-4,6-dione. The weight average molecular weight immediately before the addition of 2,8-dimethyl-4H,6H-benzo[1,2-d:5,4-d']bis-[1,3]-oxazine-4,6-dione was 50,000, and the polymer isolated after reacting for 2 hours from the addition of 2,8-dimethyl-4H,6H-benzo[1,2-d:5,4-d']bis-[1,3]-oxazine-4,G-dione had a weight average molecular weight of 220,000.

EXAMPLE 25

The same procedures as described in Example 22 were carried out except that 2,2'-bis[5(4H)-oxazolone] was replaced by 0.75 g of 2,2'-bis(2-oxazoline). The weight average molecular weight immediately before the addition of 2,2'-bis(2-oxazoline) was 50,000, and the polymer isolated after reacting for 2 hours from the addition of 2,2'-bis(2-oxazoline) had a weight average molecular weight of 230,000.

EXAMPLE 26

The same procedures as described in Example 22 were carried out except that 2,2'-bis[5(4H)-oxazolone] was replaced by 0.75 g of 2,2'-bis(5,6-dihydro-4H-1,3-oxazine). The weight average molecular weight immediately before the addition of 2,2'-bis(5,6-dihydro-4H-1,3-oxazine) was 50,000, and the polymer isolated after reacting for 2 hours from the addition of 2,2'-bis(5,6-dihydro-4H-1,3-oxazine) had a weight average molecular weight of 240,000.

EXAMPLE 27

The same procedures as described in Example 22 were carried out except that 0.75 g of 2,2'-bis[5(4H)-oxazolone] was replaced by a combination of 1.5 g of 2,2'-bis[5(4H)-oxazolone] and 0.75 g of N,N'-terephthalylbiscaprolactam. The weight average molecular weight immediately before the addition of 2,2'-bis[5(4H)-oxazolone) and N,N'-terephthalylbiscaprolactam was 50,000, and the polymer isolated after reacting for 2 hours from the addition of 2,2'-bis[5(4H)-oxazolone) and N,N'-terephthalylbiscaprolactam had a weight average molecular weight of 280,000.

EXAMPLE 28

The same procedures as described in Example 22 were carried out except that L-lactic acid was replaced by 81 g of 70% glycolic acid. The weight average molecular weight immediately before the addition of 2,2'-bis[5(4H)-oxazolone] was 51,000, and the polymer isolated after reacting for 2 hours from the addition of 2,2'-bis[5(4H)-oxazolone] had a weight average molecular weight of 250,000.

EXAMPLE 29

The same procedures as described in Example 22 were carried out except that L-lactic acid was replaced by 75 g of 90% DL-lactic acid. The weight average molecular weight immediately before the addition of 2,2'-bis[5(4H)-oxazolone] was 54,000 and the polymer isolated after reacting for 2 hours from the addition of 2,2'-bis[5(4H)-oxazolone] had a weight average molecular weight of 250,000.

EXAMPLE 30

The same procedures as described in Example 22 were carried out except that the reaction time before the addition of 2,21-bis[5(4H)-oxazolone] was 15 hours. The weight average molecular weight immediately before the addition of 2,2'-bis[5(4H)-oxazolone] was 100,000 and the polymer isolated after reacting for 2 hours from the addition of 2,2'-bis[5(4H)-oxazolone] had a weight average molecular weight of 290,000.

EXAMPLE 31

After heating 75.0 g of 90% L-lactic acid at 150° C. with stirring for 3 hours under reduced pressure of 50 mmHg while removing water out of the reaction system, 325 g of diphenyl ether and 0.4 g of tin powder were added. A tube packed with 75 g of molecular sieve 3A was mounted on the reaction vessel so as to return the distilled solvent to the reaction system after passing through the molecular sieve. The reaction conditions were set at 130° C. under reduced pressure of 15 mmHg and the reaction was carried out.

After reacting for 10 hours, a sample was taken out and a molecular weight was measured to give a weight average molecular weight of 50,000. To the reaction mess, 0.75 g of p-hydroxybenzoic acid was added and the reaction was continued at 130° C. under reduced pressure of 15 mmHg.

The viscosity of the reaction mass was rapidly increased and the reaction was finished after 2 hours from the addition of p-hydroxybenzoic acid.

The reaction mass was dissolved in 400 ml of chloroform, and suction filtered to remove tin powder. To the chloroform solution, 1,400 ml of methanol was added. The precipitated light yellow solid was filtered and dried to obtain polymer having a weight average molecular weight of 250,000.

EXAMPLE 32

The same procedures as described in Example 31 were carried out except that p-hydroxybenzoic acid was replaced by 0.75 g of o-hydroxybenzoic acid. The weight average molecular weight immediately before the addition of o-hydroxybenzoic acid was 50,000 and the polymer isolated after reacting for 2 hours from the addition of o-hydroxybenzoic acid had a weight average molecular weight of 210,000.

EXAMPLE 33

The same procedure as described in Example 31 were carried out except that L-lactic acid was replaced by 81 g of 70% glycolic acid. The weight average molecular weight immediately before the addition of p-hydroxybenzoic acid was 51,000 and the polymer isolated after reacting for 2 hours from the addition of p-hydroxybenzoic acid had a weight average molecular weight of 245,000.

EXAMPLE 34

The same procedures as described in Example 31 were carried out except that L-lactic acid was replaced by 75 g of 90% DL-lactic acid. The weight average molecular weight immediately before the addition of p-hydroxybenzoic acid was 54,000 and the polymer isolated after reacting for 2 hours from the addition of p-hydroxybenzoic acid had a weight average molecular weight of 265,000.

EXAMPLE 35

The same procedures as described in Example 31 were carried out except that the reaction time before the addition of p-hydroxybenzoic was 15 hours. The weight average molecular weight immediately before the addition of p-hydroxybenzoic acid was 100,000 and the polymer isolated after reacting for 2 hours from the addition of p-hydroxybenzoic acid had a weight average molecular weight of 290,000.

EXAMPLE 36

The same procedures as described in Example 31 were carried out except that the reaction time before the addition of p-hydroxybenzoic acid was 5 hours and 1.5 g of p-hydroxybenzoic acid was used. The weight average molecular weight immediately before the addition of p-hydroxybenzoic acid was 24,000 and the polymer isolated after reacting for 2 hours from the addition of p-hydroxybenzoic acid had a weight average molecular weight of 150,000.

EXAMPLE 37

After heating 75.0 g of 90% L-lactic acid at 150° C. with stirring for 3 hours under reduced pressure of 50 mmHg while removing water out of the reaction system, 325 g of diphenyl ether and 0.4 g of tin powder were added. A tube packed with 75 g of molecular sieve 3A was mounted on the reaction vessel so as to return the distilled solvent to the reaction system after passing through the molecular sieve. The conditions were set at 130° C. under reduced pressure of 15 mmHg and the reaction was carried out. After reacting for 10 hours, a sample was taken out and a molecular weight was measured to give an weight average molecular weight of 50,000. To the reaction mass, 0.75 g of 1,4-diaminobenzene was added and the reaction was continued at 130° C. under atmospheric pressure in a nitrogen atmosphere. The viscosity of the reaction mass rapidly increased and the reaction was finished after 2 hours from the addition of 1,4-diaminobenzene.

The reaction mass was dissolved in 400 ml of chloroform, and suction filtered to remove tin powder. To the chloroform solution 1,400 ml of methanol was added. The precipitated light yellow solid was filtered and dried to obtain polymer having a weight average molecular weight of 270,000.

EXAMPLE 38

The same procedures as described in Example 37 were carried out except that 1,4-diaminobenzene was replaced by 0.75 g of 1,2-diaminoethane. The weight average molecular weight immediately before the addition of 1,2-diaminoethane was 50,000 and the polymer isolated after reacting for 2 hours from the addition of 1,2-diaminoethane had a weight average molecular weight of 220,000.

EXAMPLE 39

The same procedures as described in Example 37 were carried out except that L-lactic acid was replaced by 81 g of 70% glycolic acid. The weight average molecular weight immediately before the addition of 1,4-diaminobenzene was 51,000 and the polymer isolated after reacting for 2 hours from the addition of 1,4-diaminobenzene had a weight average molecular weight of 240,000.

EXAMPLE 40

The same procedures as described in Example 37 were carried out except that L-lactic acid was replaced by 75 g of 90% DL-lactic acid. The weight average molecular weight immediately before the addition of 1,4-diaminobenzene was 54,000 and the polymer isolated after reacting for 2 hours from the addition of 1,4-diaminobenzene had a weight average molecular weight of 260,000.

EXAMPLE 41

The same procedures as described in Example 37 were carried out except that the reaction time before the addition of 1,4-diaminobenzene was 15 hours. The weight average molecular weight immediately before the addition of 1,4-diaminobenzene was 100,000 and the polymer isolated after reacting for 2 hours from the addition of 1,4-diaminobenzene had a weight average molecular weight of 300,000.

EXAMPLE 42

The same procedures as described in Example 37 were carried out except that 1,4-diaminobenzene was replaced by 0.75 g of melamine. The weight average molecular weight immediately before the addition of melamine was 50,000 and the polymer isolated after reacting for 2 hours from the addition of melamine had a weight average molecular weight of 260,000.

EXAMPLE 43

The same procedures as described in Example 37 were carried out except that 1,4-diaminobenzene was replaced by 0.75 g of 1,3,5-triaminobenzene. The weight average molecular weight immediately before the addition of 1,3,5-triaminobenzene was 50,000 and the polymer isolated after reacting for 2 hours from the addition of 1,3,5-triaminobenzene had a weight average molecular weight of 215,000.

EXAMPLE 44

After heating 75.0 g of 90% L-lactic acid at 150° C. with stirring for 3 hours under reduced pressure of 50 mmHg while removing water out of the reaction system, 325 g of diphenyl ether and 0.4 g of tin powder were added. A tube packed with 75 g of molecular sieve 3A was mounted on the reaction vessel so as to return the distilled solvent to the reaction system after passing through the molecular sieve. The reaction conditions were set at 130° C. under reduced pressure of 15 mmHg and the reaction was carried out.

After reacting for 10 hours, a sample was taken out and a molecular weight was measured to give a weight average molecular weight of 50,000. To the reaction mass, 0.75 g of maleic anhydride was added and the reaction was continued at 130° C. under atmospheric pressure in a nitrogen atmosphere. After reacting for 2 hours, 0.75 g of 1,4-diaminobenzene was further added to the reaction mass and the reaction was continued at 130° C. under atmospheric pressure in a nitrogen atmosphere. The viscosity of the reaction mass was rapidly increased and the reaction was finished after 2 hours from the addition of 1,4-diaminobenzene.

After finishing the reaction, the reaction mass was dissolved by adding 400 ml of chloroform and suction filtered to remove tin powder. To the chloroform solution thus obtained, 1,400 ml of methanol was added and the precipitated light yellow solid was filtered and dried. The polymer obtained had a weight average molecular weight of 310,000.

EXAMPLE 45

The same procedures as described in Example 44 were carried out except that 1,4-diaminobenzene was replaced by 0.75 g of 1,2-diaminoethane. The weight average molecular weight immediately before the addition of maleic anhydride was 50,000.

The polymer isolated after finishing the reaction had a weight average molecular weight of 290,000.

EXAMPLE 46

The same procedures as described in Example 44 were carried out except that 1,4-diaminobenzene was replaced by 0.75 g of melamine. The weight average molecular weight immediately before the addition of maleic anhydride was 50,000.

The polymer isolated after finishing the reaction had a weight average molecular weight of 245,000.

EXAMPLE 47

The same procedures as described in Example 44 were carried out except that 1,4-diaminobenzene was replaced by 0.75 g of 1,3,5-triaminobenzene. The weight average molecular weight immediately before the addition of maleic anhydride was 50,000.

The polymer isolated after finishing the reaction had a weight average molecular weight of 235,000.

EXAMPLE 48

The same procedures as described in Example 44 were carried out except that 1,4-diaminobenzene was replaced by 0.75 g of 1,2,4,5-tetraaminobenzene. The weight average molecular weight immediately before the addition of maleic anhydride was 50,000.

The polymer isolated after finishing the reaction had a weight average molecular weight of 200,000.

EXAMPLE 49

The same procedures as described in Example 44 were carried out except that L-lactic acid was replaced by 81 g of 70% glycolic acid. The weight average molecular weight immediately before the addition of maleic anhydride was 51,000.

The polymer isolated after finishing the reaction had a weight average molecular weight of 255,000.

EXAMPLE 50

The same procedures as described in Example 44 were carried out except that L-lactic acid was replaced by 75 g of 90% DL-lactic acid. The weight average molecular weight immediately before the addition of maleic anhydride was 54,000.

The polymer isolated after finishing the reaction had a weight average molecular weight of 255,000.

EXAMPLE 51

The same procedures as described in Example 44 were carried out except that the reaction time before the addition of maleic anhydride was 15 hours. The weight average molecular weight immediately before the addition of maleic anhydride was 100,000. The polymer isolated after finishing the reaction had a weight average molecular weight of 320,000.

EXAMPLE 52

After heating 75.0 g of 90% L-lactic acid at 150° C. with stirring for 3 hours under reduced pressure of 50 mmHg while removing water out of the reaction system, 325 g of diphenyl ether and 0.4 g of tin powder were added. A tube packed with 75 g of molecular sieve 3A was mounted on the reaction vessel so as to return the distilled solvent to the reaction system after passing through the molecular sieve. The reaction conditions were set at 130° C. under reduced pressure of 15 mmHg and the reaction was carried out.

After reacting for 10 hours, a sample was taken out and a molecular weight was measured to give a weight average molecular weight of 50,000. To the reaction mass, 0.2 g of 1,4-butanediol was added and the reaction was continued at 130° C. under reduced pressure of 15 mmHg.

The viscosity of the reaction mass was rapidly increased and the reaction was finished after 2 hours from the addition of 1,4-butanediol.

The reaction mass was dissolved in 400 ml of chloroform, and suction filtered to remove tin powder. To the chloroform solution, 1,400 ml of methanol was added. The precipitated white solid was filtered and dried to obtain polymer having a weight average molecular weight of 167,000.

EXAMPLE 53

The same procedures as described in Example 52 were carried out except that 1,4-butanediol was replaced by 0.1 g of pentaerythritol. The weight average molecular weight immediately before the addition of pentaerythritol was 50,000.

The polymer isolated after reacting for 2 hours from the addition of pentaerythritol had a weight average molecular weight of 198,000.

EXAMPLE 54

The same procedures as described in Example 52 were carried out except that L-lactic acid was replaced by 81 g of 70% glycolic acid. The weight average molecular weight immediately before the addition of 1,4-butanediol was 51,000.

The polymer isolated after reacting for 2 hours from the addition of 1,4-butanediol had a weight average molecular weight of 127,000.

EXAMPLE 55

The same procedures as described in Example 52 were carried out except that L-lactic acid was replaced by 75 g of 90% DL-lactic acid. The weight average molecular weight immediately before the addition of 1,4-butanediol was 50,000.

The polymer isolated after reacting for 2 hours from the addition of 1,4-butanediol had a weight average molecular weight of 204,000.

EXAMPLE 56

The same procedures as described in Example 52 were carried out except that 1,4-butanediol was replaced by 0.75 g of ethyleneglycol diglycidyl ether. The weight average molecular weight immediately before the addition of ethyleneglycol diglycidyl ether was 50,000.

The polymer isolated after reacting for 2 hours from the addition of ethyleneglycol diglycidyl ether had a weight average molecular weight of 182,000.

EXAMPLE 57

The same procedures as described in Example 52 were carried out except that 1,4-butanediol was replaced by 0.75 g of diglycidyl terephthalate. The weight average molecular weight immediately before the addition of diglycidyl terephthalate was 52,000.

The polymer isolated after reacting for 2 hours from the addition of diglycidyl terephthalate had a weight average molecular weight of 229,000.

EXAMPLE 58

The same procedures as described in Example 52 were carried out except that 1,4-butanediol was replaced by 0.4 g of 2,2-bishydroxymethylbutanol tris[3-(1-aziridinyl) propionate]. The weight average molecular weight immediately before the addition of 2,2-bishydroxymethylbutanol tris[3-(1-aziridinyl) propionate] was 50,000.

The polymer isolated after reacting for 2 hours from the addition of 2,2-bishydroxymethylbutanol tris[3-(1-aziridinyl) propionate] had a weight average molecular weight of 176,000.

EXAMPLE 59

The same procedures as described in Example 52 were carried out except that 1,4-butanediol was replaced by 0.2 g of 2-pyrrolidone. The weight average molecular weight immediately before the addition of 2-pyrrolidone was 50,000.

The polymer isolated after reacting for 2 hours from the addition of 2-pyrrolidone had a weight average molecular weight of 185,000.

EXAMPLE 60

The same procedures as described in Example 52 were carried out except that 0.1 g of 1,4-dioxanone was used in place of 1,4-butanediol and reacted for 5 hours after the addition. The weight average molecular weight immediately before the addition of 1,4-dioxanone was 50,000.

The polymer isolated after reacting for 5 hours from the addition of 1,4-dioxanone had a weight average molecular weight of 169,000.

EXAMPLE 61

The same procedures as described in Example 52 were carried out except that 1,4-butanediol was replaced by 0.1 g of ethyleneglycol bischloroformate. The weight average molecular weight immediately before the addition of ethyleneglycol bischloroformate was 55,000.

The polymer isolated after reacting for 2 hours from the addition of ethyleneglycol bischloroformate had a weight average molecular weight of 184,000.

COMPARATIVE EXAMPLE 1

After heating 75.0 g of 90% L-lactic acid at 140° C. with stirring for 3 hours under reduced pressure of 160 mmHg while removing water out of the reaction system, heating was further continued with stirring at 220° C. under reduced pressure of 10 mmHg. After reacting for 20 hours, a sample was taken out and a molecular weight was measured to give an weight average molecular weight of 7,000.

To the reaction mass, 0.75 g of xylene diisocyanate was added and the reaction was continued at 220° C. in a nitrogen atmosphere. After the addition of xylene diisocyanate, sampling was time-dependently carried out and a weight average molecular weight was measured. The sample had a weight average molecular weight of 16,000 after reacting for 2 hours and 17,000 after reacting for 8 hours, respectively. It was assumed that the low molecular weight of polyhydroxycarboxylic acid before the addition of xylene diisocyanate led to many remaining molecular chain ends and thus a great amount of generated condensation water reacted with the isocyanate group to inhibit sufficient increase in the molecular weight.

COMPARATIVE EXAMPLE 2

The same procedures as described in Comparative Example 1 were carried out except that 2.25 g of xylene diisocyanate was used.

The weight average molecular weight immediately before addition of xylene diisocyanate was 7,000. After the addition of xylene diisocyanate, sampling was time-dependently carried out and an weight average molecular weight was measured. The sample had a weight average molecular weight of 20,000 after reacting for 2 hours and 21,000 after reacting for 8 hours, respectively. It was assumed that the low molecular weight of polyhydroxycarboxylic acid before the addition of xylene diisocyanate led to many remaining molecular chain ends and thus a great amount of generated condensation water reacted with the isocyanate group to inhibit sufficient increase in the molecular weight.

COMPARATIVE EXAMPLE 3

The same procedures as described in Comparative Example 1 were carried out except that 3.75 g of xylene diisocyanate was used.

The weight average molecular weight immediately before addition of xylene diisocyanate was 7,000. After the addition of xylene diisocyanate, sampling was time-dependently carried out and a weight average molecular weight was measured. The sample had an weight average molecular weight of 22,000 after reacting for 2 hours and 23,000 after reacting for 8 hours, respectively. It was assumed that the low molecular weight of polyhydroxycarboxylic acid before the addition of xylene diisocyanate led to many remaining molecular chain ends and thus a great amount of generated condensation water reacted with the isocyanate group to inhibit sufficient increase in the molecular weight.

COMPARATIVE EXAMPLE 4

The same procedures as described in Comparative Example 1 were carried out except that L-lactic acid was replaced by 81 g of 70% glycolic acid.

The weight average molecular weight immediately before addition of xylene diisocyanate was 6,000. After the addition of xylene diisocyanate, sampling was time-dependently carried out and an weight average molecular weight was measured. The sample had a weight average molecular weight of 19,000 after reacting for 2 hours and 19,000 after reacting for 8 hours, respectively. It was assumed that the low molecular weight of polyhydroxycarboxylic acid before the addition of xylene diisocyanate led to many remaining molecular chain ends and thus a great amount of generated condensation water reacted with the isocyanate group to inhibit sufficient increase in the molecular weight.

COMPARATIVE EXAMPLE 5

The same procedures as described in Comparative Example 1 were carried out except that L-lactic acid was replaced by 75 g of 90% DL-lactic acid.

The weight average molecular weight immediately before addition of xylene diisocyanate was 7,000. After the addition of xylene diisocyanate, sampling was time-dependently carried out and a weight average molecular weight was measured. The sample had a weight average molecular weight of 18,000 after reacting for 2 hours and 19,000 after reacting for 8 hours, respectively. It was assumed that the low molecular weight of polyhydroxycarboxylic acid before the addition of xylene diisocyanate led to many remaining molecular chain ends and thus a great amount of generated condensation water reacted with the isocyanate group to inhibit sufficient increase in the molecular weight.

COMPARATIVE EXAMPLE 6

The same procedures as described in Comparative Example 1 were carried out except that L-lactic acid was replaced by 67.5 g of 90% L-lactic acid and 8.1 g of 70% glycolic acid.

The weight average molecular weight immediately before addition of xylene diisocyanate was 7,000. After the addition of xylene diisocyanate, sampling was time-dependently carried out and a weight average molecular weight was measured. The sample had a weight average molecular weight of 21,000 after reacting for 2 hours and 22,000 after reacting for 8 hours, respectively. It was assumed that the low molecular weight of polyhydroxycarboxylic acid before the addition of xylene diisocyanate led to many remaining molecular chain ends and thus a great amount of generated condensation water reacted with the isocyanate group to inhibit sufficient increase in the molecular weight.

COMPARATIVE EXAMPLE 7

After heating 75.0 g of 90% L-lactic acid at 140° C. with stirring for 3 hours under reduced pressure of 160 mmHg while removing water out of the reaction system as carried out in Example 1, 325 g of o-dichlorobenzene and 0.4 g of tin powder were added. A tube packed with 75 g of molecular sieve 3A was mounted on the reaction vessel so as to return the distilled solvent to the reaction system after passing through the molecular sieve. The reaction conditions were set at 130° C. under reduced pressure of 15 mmHg and the reaction was carried out.

Sampling was time-dependently carried out and the reaction between the reaction time and molecular weight was examined.

The weight average molecular weight was 50,000 after reacting for 8 hours, 100,000 after reacting for 15 hours, 150,000 after reacting for 20 hours, and 250,000 after reacting for 30 hours, respectively. It was seen that a long reaction time was required in order to obtain a high molecular weight polymer as compared with Example 1.

COMPARATIVE EXAMPLE 8

The same procedures as described in Comparative Example 7 except that 90% L-lactic acid was replaced by 81 g of 70% glycolic acid.

Sampling was time-dependently carried out and the reaction between the reaction time and molecular weight was examined.

The weight average molecular weight was 49,000 after reacting for 8 hours, 89,000 after reacting for 15 hours, 135,000 after reacting for 20 hours, and 210,000 after reacting for 30 hours, respectively. It was seen that a long reaction time was required in order to obtain a high molecular weight polymer as compared with Example 14.

COMPARATIVE EXAMPLE 9

The same procedures as described in Comparative Example 7 except that 90% L-lactic acid was replaced by 75 g of 90% DL-lactic acid.

Sampling was time-dependently carried out and the reaction between the reaction time and molecular weight was examined.

The weight average molecular weight was 49,000 after reacting for 8 hours, 98,000 after reacting for 15 hours, 144,000 after reacting for 20 hours, and 260,000 after reacting for 30 hours, respectively. It was seen that a long reaction time was required in order to obtain a high molecular weight polymer as compared with Example 15.

COMPARATIVE EXAMPLE 10

The same procedures as described in Comparative Example 7 except that 90% L-lactic acid was replaced by a mixture of 67.5 g of 90% L-lactic acid and 8.1 g of 70% of glycolic acid.

Sampling was time-dependently carried out and the reaction between the reaction time and molecular weight was examined.

The weight average molecular weight was 51,000 after reacting for 8 hours, 85,000 after reacting for 15 hours, 126,000 after reacting for 20 hours, and 235,000 after reacting for 30 hours, respectively. It was seen that a long reaction time was required in order to obtain a high molecular weight polymer as compared with Example 16.

What is claimed is:

1. A preparation process of polyhydroxycarboxylic acid comprising conducting dehydration polycondensation of hydroxycarboxylic acid or an oligomer of the same in a reaction mixture containing said hydroxycarboxylic acid or the oligomer of the same and an organic solvent substantially in the absence of water to give polyhydroxycarboxylic acid having an weight average molecular weight of 50,000 or more, successively mixing the reaction mixture containing said polyhydroxycarboxylic acid with at least one of the binder selected from the group consisting of (1) polyisocyanate compound, (2) polybasic acid anhydride, (3) cyclic imino ester, (4) cyclic imino ether, (5) aromatic hydroxycarboxylic acid, (6) polyamino compound, (7) polyhydric alcohol, (8) epoxy compound, (9) polyfunctional aziridine compound, (10) lactam, (11) lactone, and (12) diethylene glycol bischloroforate and reacting to obtain polyhydroxycarboxylic acid having a weight average molecular weight greater than the weight average molecular weight of the polyhydroxycarboxylic acid prior to the reaction with the binder and being 100,000 or more.

2. A process according to claim 1 wherein at least a portion of the organic solvent is removed from the reaction mixture and additional organic solvent having a water content less than or equal to that of the organic solvent removed is charged to said reaction mixture.

3. A process according to claim 2 wherein the organic solvent removed from the reaction mixture is brought into contact with a drying agent to reduce the water content and is returned to the reaction mixture as the additional organic solvent.

4. A process according to claim 3 wherein the drying agent is a molecular sieve.

5. A process according to claim 2 wherein the organic solvent which is additionally charged to the reaction mixture has a water content of 50 ppm or less.

6. A process according to claim 5 wherein the organic solvent is at least one solvent selected from the group consisting of a non-halogenated hydrocarbon compound, halogenated hydrocarbon compound, ether compound, ester compound and ketone compound.

7. A process according to claim 6 wherein the dehydration polycondensation is carried out in the presence of a metal or a compound thereof selected from the group consisting of Sn, Ti and Ni, as a catalyst.

8. A process according to claim 7 wherein the hydroxycarboxylic acid is lactic acid or a mixture of lactic acid and another hydroxycarboxylic acid.

9. A process according to claim 4 wherein the organic solvent is at least one solvent selected from the group comprising of a non-halogenated hydrocarbon compound, halogenated hydrocarbon compound, ether compound, ester compound and ketone compound.

10. A process according to claim 3 wherein the organic solvent is at least one solvent selected from the group comprising of a non-halogenated hydrocarbon compound, halogenated hydrocarbon compound, ether compound, ester compound and ketone compound.

11. A process according to claim 2 wherein the organic solvent is at least one solvent selected from the group consisting of a non-halogenated hydrocarbon compound, halogenated hydrocarbon compound, ether compound, ester compound and ketone compound.

12. A process according to claim 1 wherein the organic solvent is at least one solvent selected from the group consisting of a non-halogenated hydrocarbon compound, halogenated hydrocarbon compound, ether compound, ester compound and ketone compound.

13. A process according to claim 12 wherein the dehydration polycondensation is carried out in the presence of a metal or a compound thereof selected from the group consisting of Sn, Ti and Ni, as a catalyst.

14. A process according to claim 5 wherein the dehydration polycondensation is carried out in the presence of a metal or a compound thereof selected from the group consisting of Sn, Ti and Ni, as a catalyst.

15. A process according to claim 4 wherein the dehydration polycondensation is carried out in the presence of a metal or a compound thereof selected from the group consisting of Sn, Ti and Ni, as a catalyst.

16. A process according to claim 3 wherein the dehydration polycondensation is carried out in the presence of a metal or a compound thereof selected from the group consisting of Sn, Ti and Ni, as a catalyst.

17. A process according to claim 2 wherein the dehydration polycondensation is carried out in the presence of a metal or a compound thereof selected from the group consisting of Sn, Ti and Ni, as a catalyst.

18. A process according to claim 17 wherein the hydroxycarboxylic acid is lactic acid or a mixture of lactic acid and another hydroxycarboxylic acid.

19. A process according to claim 12 wherein the hydroxycarboxylic acid is lactic acid or a mixture of lactic acid and another hydroxycarboxylic acid.

20. A process according to claim 5 wherein the hydroxycarboxylic acid is lactic acid or a mixture of lactic acid and another hydroxycarboxylic acid.

21. A process according to claim 4 wherein the hydroxycarboxylic acid is lactic acid or a mixture of lactic acid and another hydroxycarboxylic acid.

22. A process according to claim 3 wherein the hydroxycarboxylic acid is lactic acid or a mixture of lactic acid and another hydroxycarboxylic acid.

23. A process according to claim 2 wherein the hydroxycarboxylic acid is lactic acid or a mixture of lactic acid and another hydroxycarboxylic acid.

24. A process according to claim 1 wherein the hydroxycarboxylic acid is lactic acid or a mixture of lactic acid and another hydroxycarboxylic acid.

* * * * *